United States Patent
Shi et al.

(10) Patent No.: US 12,217,385 B2
(45) Date of Patent: *Feb. 4, 2025

(54) IMAGE PROCESSING DEVICE, METHOD AND COMPUTER-READABLE STORAGE MEDIUM TO DETERMINE RESOLUTION OF PROCESSED REGIONS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Tiankuo Shi, Beijing (CN); Xiaomang Zhang, Beijing (CN); Xuefeng Wang, Beijing (CN); Bin Dai, Beijing (CN); Lingyun Shi, Beijing (CN); Wei Sun, Beijing (CN); Bo Gao, Beijing (CN); Yue Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/575,304

(22) Filed: Jan. 13, 2022

(65) Prior Publication Data
US 2022/0138901 A1    May 5, 2022

Related U.S. Application Data

(63) Continuation-in-part of application No. 16/309,355, filed as application No. PCT/CN2018/082294 on Apr. 9, 2018, now Pat. No. 11,232,767.

(30) Foreign Application Priority Data

Aug. 9, 2017    (CN) .......................... 201710674693.6

(51) Int. Cl.
*G06T 3/40*    (2024.01)
*G06T 3/4038*    (2024.01)
(Continued)

(52) U.S. Cl.
CPC ............. *G06T 3/4038* (2013.01); *G06T 7/11* (2017.01); *G06V 40/18* (2022.01); *G06T 2207/20021* (2013.01)

(58) Field of Classification Search
CPC .................... G06T 3/4038; G06T 7/11; G06T 2207/20021; G06T 3/4053; G06V 40/18;
(Continued)

(56) References Cited

U.S. PATENT DOCUMENTS 10,460,676 B2 * 10/2019 Yashiki .................. G09G 5/04
10,614,549 B2    4/2020 Berghoff
(Continued)

FOREIGN PATENT DOCUMENTS

CN    103745448 A    4/2014
CN    103886825 A    6/2014
(Continued)

OTHER PUBLICATIONS

Reingold et al., Gaze-Contingent Multiresolutional Displays: An Integrative Review, Human Factors, pp. 307-328, vol. 45, No. 2, Summer 2003 (Year: 2003).*
(Continued)

*Primary Examiner* — Michael Le
(74) *Attorney, Agent, or Firm* — Collard & Roe, P.C.; William Collard

(57) ABSTRACT

An image display method, an image processing method, an image processing device, a display system, and a computer-
(Continued)

readable storage medium are disclosed. The image processing method is applied to an image processing device and includes: determining a first region in an original image; performing first processing on the first region in the original image to obtain a first processed region; performing second processing on the original image to obtain a second processed region; generating a first image based on the first processed region and the second processed region. A resolution of the first processed region is greater than a resolution of the second processed region.

19 Claims, 13 Drawing Sheets

(51) Int. Cl.
*G06T 7/11* (2017.01)
*G06V 40/18* (2022.01)

(58) Field of Classification Search
CPC ............ G06V 20/20; G02B 2027/0138; G02B 2027/0147; G02B 2027/0187; G02B 27/017; G06F 3/011; G06F 3/013; G09G 5/36; G09G 2340/0407
See application file for complete search history.

(56) References Cited

U.S. PATENT DOCUMENTS

| | | | | |
|---|---|---|---|---|
| 10,803,829 | B2* | 10/2020 | Harada | G09G 3/3413 |
| 10,979,676 | B1* | 4/2021 | Kelly | H04N 21/44008 |
| 2002/0141614 | A1* | 10/2002 | Lin | H04N 19/17 |
| | | | | 375/E7.182 |
| 2008/0290794 | A1 | 11/2008 | Yuasa | |
| 2009/0142000 | A1* | 6/2009 | Sono | G06T 5/70 |
| | | | | 382/274 |
| 2010/0225680 | A1 | 9/2010 | Kido | |
| 2011/0279457 | A1* | 11/2011 | Song | G06T 7/001 |
| | | | | 345/428 |
| 2012/0121209 | A1* | 5/2012 | Li | G06T 7/11 |
| | | | | 382/307 |
| 2012/0189221 | A1* | 7/2012 | Inada | G06F 3/14 |
| | | | | 382/240 |
| 2012/0268465 | A1 | 10/2012 | Inada | |
| 2014/0368494 | A1 | 12/2014 | Sakharnykh et al. | |
| 2015/0287165 | A1 | 10/2015 | Berghoff | |
| 2015/0371583 | A1* | 12/2015 | Guo | G09G 3/2074 |
| | | | | 345/694 |
| 2016/0234488 | A1 | 8/2016 | Zhao et al. | |
| 2016/0267713 | A1* | 9/2016 | Patel | G06T 19/20 |
| 2016/0267884 | A1* | 9/2016 | Binstock | G06F 3/013 |
| 2016/0307297 | A1* | 10/2016 | Akenine-Moller | G06F 3/011 |
| 2017/0041502 | A1* | 2/2017 | Fuse | H04N 1/58 |
| 2017/0094163 | A1* | 3/2017 | Ohba | G06T 3/40 |
| 2017/0178408 | A1 | 6/2017 | Bavor, Jr. et al. | |
| 2017/0263190 | A1* | 9/2017 | Yashiki | G02F 1/133621 |
| 2018/0047176 | A1* | 2/2018 | Toyoda | G06T 5/50 |
| 2018/0336660 | A1 | 11/2018 | Gu | |
| 2018/0336867 | A1 | 11/2018 | Gu et al. | |
| 2019/0355332 | A1* | 11/2019 | Knez | G09G 5/391 |
| 2019/0362063 | A1 | 11/2019 | Wu | |
| 2020/0034947 | A1* | 1/2020 | Wang | G06T 3/04 |
| 2020/0388002 | A1* | 12/2020 | Jung | G06T 3/12 |

FOREIGN PATENT DOCUMENTS

| | | |
|---|---|---|
| CN | 106373537 A | 2/2017 |
| CN | 106412563 A | 2/2017 |
| CN | 106485790 A | 3/2017 |
| CN | 106980983 A | 7/2017 |
| CN | 107194890 A | 9/2017 |
| CN | 107194891 A | 9/2017 |
| EP | 2242280 A2 | 10/2010 |
| JP | 2010210704 A | 9/2010 |
| JP | 2017517025 A | 6/2017 |

OTHER PUBLICATIONS

International Search Report of PCT/CN2018/082294 in Chinese, mailed May 30, 2018 with English translation.
Notice of Transmittal of the International Search Report of PCT/CN2018/082294 in Chinese, mailed May 30, 2018.
Written Opinion of the International Searching Authority of PCT/CN2018/082294 in Chinese, mailed May 30, 2018 with English translation.
Extended European Search Report in European Patent Application No. 18814480.2 dated Mar. 22, 2021.
Reingold et al., Gaze-Contingent Multiresolutional Displays: An Integrative Review, Human Factors, pp. 307-328, vol. 45, No. 2, Summer 2003.
Stengel et al., Gaze-Contingent Computational Displays, IEEE Signal Processing Magazine, Sep. 2016, pp. 139-148.
Guenter et al., Foveated 3D Graphics, Microsoft Research, 10 pages.
Ohshima et al., Gaze-Directed Adaptive Rendering for Interacting with Virtual Space, Media Technology Laboratory, Canon Inc., IEEE Proceedings of VRAIS '96, pp. 103-110.
U.S. Office Action in U.S. Appl. No. 16/309,355 dated May 28, 2021.
Notice of Allowance in U.S. Appl. No. 16/309,355 dated Sep. 10, 2021.
Chinese Office Action in Chinese Application No. 201710674693.6, mailed Dec. 16, 2019 with English translation.
Display Daily: "BOE Shows a Wide Range of Panels", May 31, 206; SID Display Week 2016: vol. 23, Issue 21 (Year: 2016).
Japanese Office Action in Japanese Application No. 2018-566354 dated May 8, 2022 with English translation.

* cited by examiner

IMAGE PROCESSING DEVICE, METHOD AND COMPUTER-READABLE STORAGE MEDIUM TO DETERMINE RESOLUTION OF PROCESSED REGIONS

CROSS-REFERENCE TO RELATED APPLICATION

This application is a continuation-in-part of application Ser. No. 16/309,355, filed Dec. 12, 2018 which was the National Stage of international Application No. PCT/CN2018/082294, filed Apr. 9, 2018, which claimed priority to Chinese Patent Application No. 201710674693.6, filed on Aug. 9, 2017, the entire disclosures each of which are hereby entirely incorporated by reference.

TECHNICAL FIELD

The embodiments of the present disclosure relate to an image display method, an image processing method, an image processing device, a display system, and a computer-readable storage medium.

BACKGROUND

Virtual Reality (VR) is a computer simulation technology which may create and experience a virtual world. The VR technology may be applied to many fields such as medical science, amusement, games, military astronautics, exhibitions and demonstration, or the like.

With development of display technologies, demands from human for a resolution of a display device raise increasingly. A product with a high resolution (such as a 4K resolution) requires a relatively large data transmission amount, thereby reducing a refresh rate of an electronic product. The VR technology is strict in the resolution, refresh rate, or the like, for example, the VR technology requires the refresh rate up to more than 90 Hz, so as to ensure that a user would not feel dizzy. Therefore, the data transmission amount has become an urgent problem in the VR technology.

SUMMARY

At least an embodiment of the present disclosure provides an image display method, which comprises: acquiring a first image; determining a first region and a second region in the first image; performing a first rendering algorithm on the first region in the first image and performing a second rendering algorithm on the second region in the first image, so as to obtain a second image, where a rendering resolution of the first rendering algorithm is greater than a rendering resolution of the second rendering algorithm; and displaying the second image.

At least an embodiment of the present disclosure further provides a display system, which comprises a display device. The display device comprises a display panel, a first processor and a first memory. The first memory stores a first computer instruction, and following steps are implemented when the first computer instruction is executed by the first processor: acquiring a first image; determining a first region and a second region in the first image; performing a first rendering algorithm on the first region in the first image and performing a second rendering algorithm on the second region in the first image, so as to obtain a second image, where a rendering resolution of the first rendering algorithm is greater than a rendering resolution of the second rendering algorithm; and displaying the second image on the display panel.

At least an embodiment of the present disclosure further provides a computer-readable storage medium, which stores computer instructions, and the image display method according to any one of the above embodiments can be performed when the computer instructions is executed by a processor.

At least an embodiment of the present disclosure provides an image processing method, the image processing method is applied to an image processing device and comprises: determining a first region in an original image; performing first processing on the first region in the original image to obtain a first processed region; performing second processing on the original image to obtain a second processed region; generating a first image based on the first processed region and the second processed region. A resolution of the first processed region is greater than a resolution of the second processed region.

At least an embodiment of the present disclosure provides an image processing method, the image processing method is applied to an image processing device and comprises: determining a first region in an original image; performing first processing on the first region in the original image to obtain a first processed region; performing second processing on the original image to obtain a second processed region; outputting the first processed region and the second processed region to a display device. A resolution of the first processed region is greater than a resolution of the second processed region.

At least an embodiment of the present disclosure provides an image processing method, the image processing method is applied to an image processing device and comprises: generating a first image, the first image comprising a first region; performing analyzing processing on the first region by using a first analyzing algorithm to obtain the first to-be-displayed region; performing analyzing processing on at least a portion of the first image by using a second analyzing algorithm to obtain a second to-be-displayed region; generating a second image based on the first to-be-displayed region and the second to-be-displayed region; outputting the second image to a display device to display the second image through the display device. A resolution of a region in the first image other than the first region is less than a resolution of the first region, and a resolution of the first to-be-displayed region is greater than a resolution of the second to-be-displayed region.

At least an embodiment of the present disclosure provides an image display method, an image processing method, an image processing device, a display system and a computer-readable storage medium. By performing different rendering algorithms on different display regions at the display device, the image display method achieves fixation point rendering effects, reduces the data transmission amount of the image, saves host power consumption, and increases the refresh rate of a display screen.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
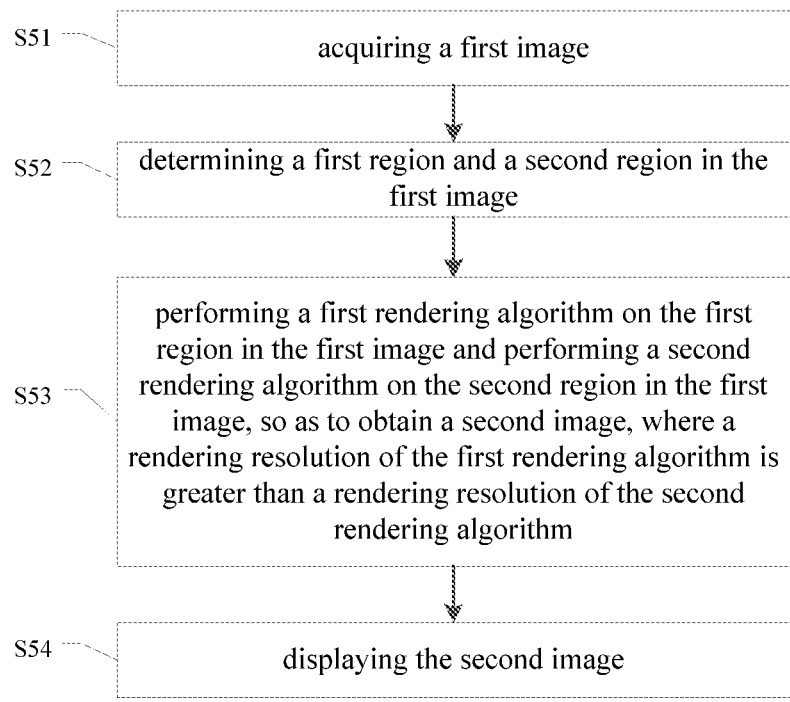
FIG. 1 is a schematic flow chart of an image display method according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to make following descriptions of the embodiments of the present disclosure clear and concise, the present disclosure omits detailed descriptions of known functions and known components.

Fixation point rendering technology is a selective image rendering technology, which selects a fixation region of human eyes based on an eyeball tracking technology, so as to perform full resolution rendering on the fixation region, and perform blur rendering on regions other than the fixation region of human eyes, thereby displaying an image with a clear fixation region and a blurry non-fixation region. The fixation point rendering technology achieve a goal of reducing the data transmission amount by only rendering the image of the fixation region, thereby saving computer operational resources and reducing power consumption. A VR product based on the fixation point rendering technology may reduce the data transmission amount, ease the rendering burden of the computer, and implement a high resolution and a high refresh rate.

At least one embodiment of the present disclosure provides an image display method, a display system and a computer-readable storage medium. By performing different rendering algorithms on different display regions at the display device, the image display method achieves fixation point rendering effects, reduces the data transmission amount of the image, saves host power consumption, and increases the refresh rate of a display screen.

The embodiments of the present disclosure are described in detail below with reference to the accompanying drawings; however the present disclosure is not limited to these specific embodiments.

Figure 2A:
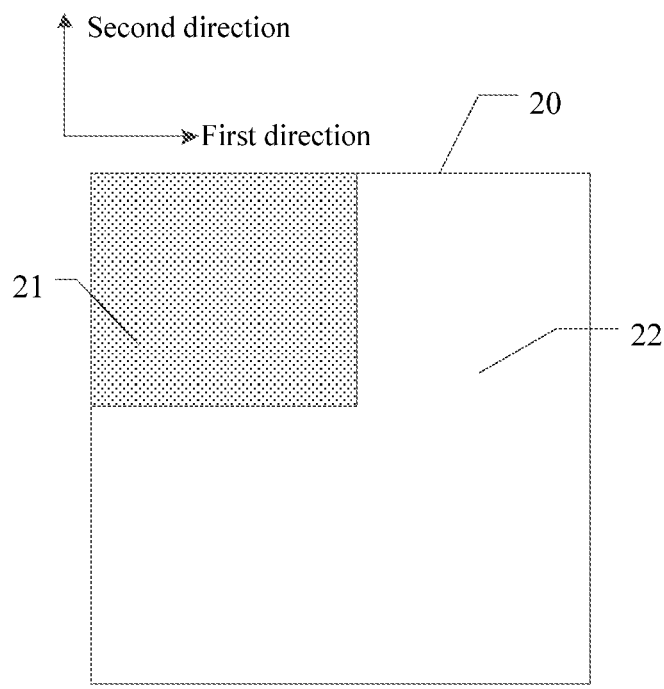
FIGS. 2A and 2B are schematic diagrams of a first region and a second region in first images according to an embodiment of the present disclosure.
Figure 2B:
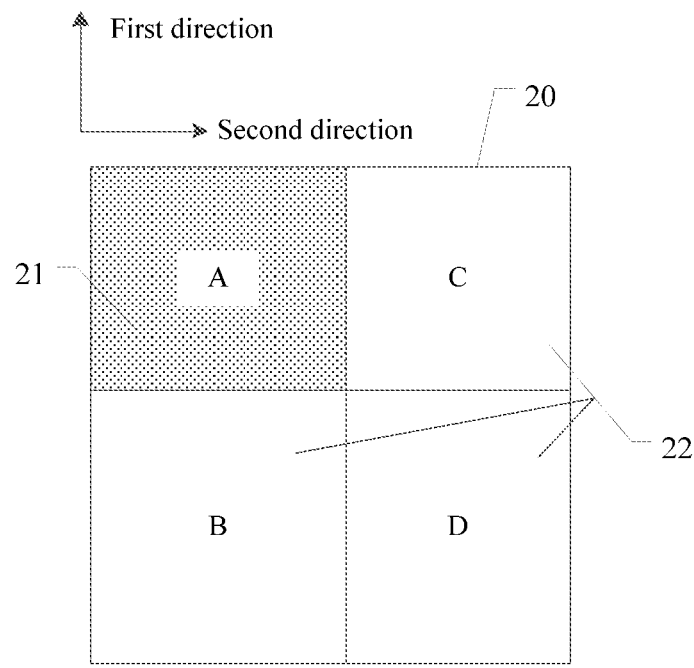
Figure 3:
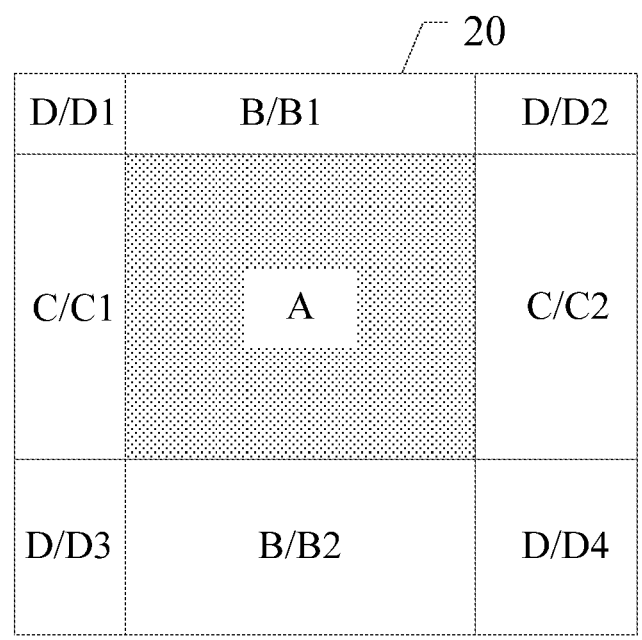
FIG. 3 is a schematic diagram of a first region and a second region in a first image according to another embodiment of the present disclosure.
Figure 4:
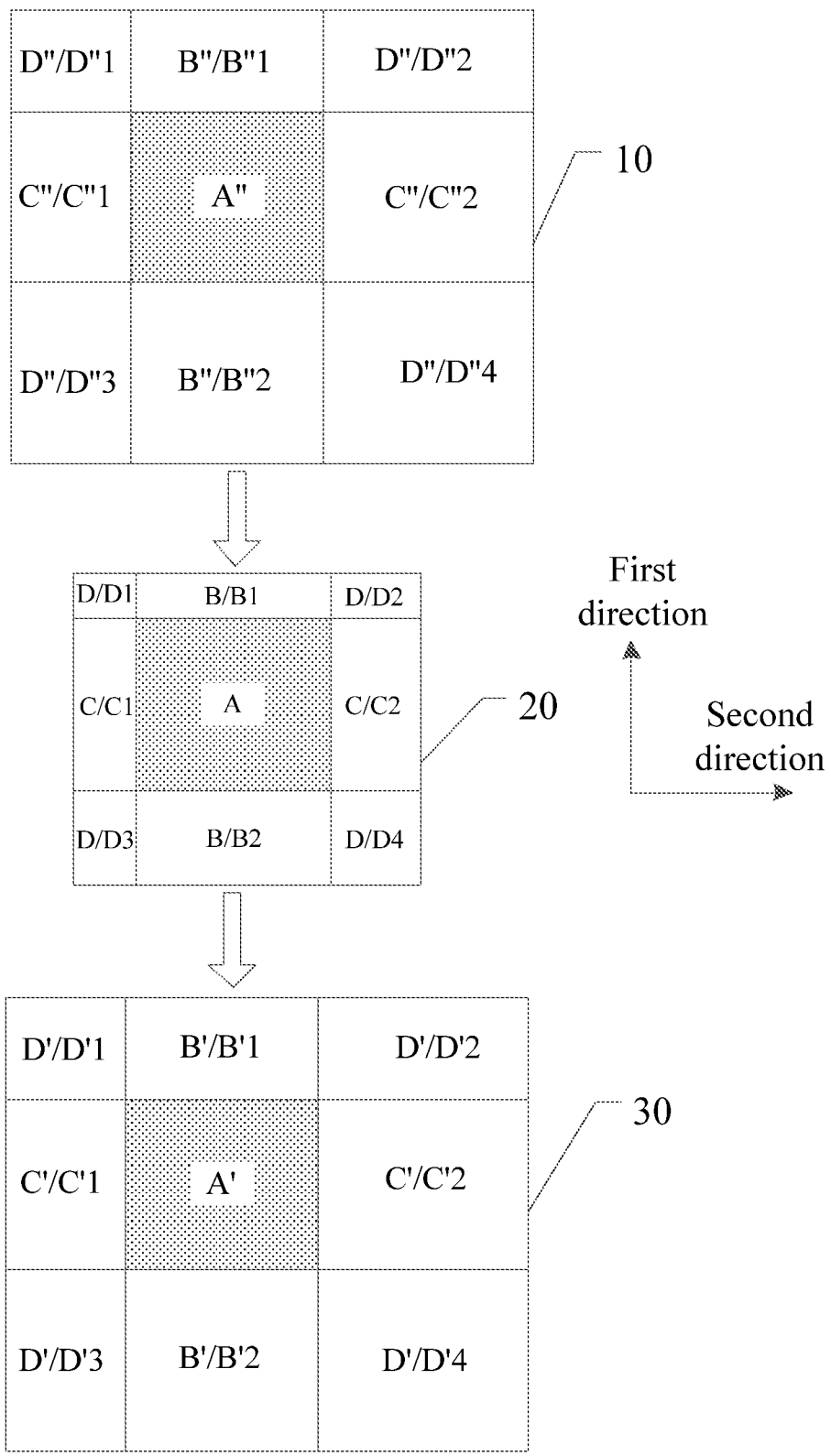
FIG. 4 is a schematic diagram of conversion among an original image, a first image and a second image according to an embodiment of the present disclosure.

FIG. 1 is a schematic flow chart of an image display method according to an embodiment of the present disclosure; FIGS. 2A and 2B are schematic diagrams of a first region and a second region in first images according to an embodiment of the present disclosure; FIG. 3 is a schematic diagram of a first region and a second region in a first image according to another embodiment of the present disclosure; FIG. 4 is a schematic diagram of conversion among an original image, a first image and a second image according to an embodiment of the present disclosure.

For example, as shown in FIG. 1, the image display method according to the embodiment of the present disclosure includes following steps:

S51: acquiring a first image;

S52: determining a first region and a second region in the first image;

S53: performing a first rendering algorithm on the first region in the first image and performing a second rendering algorithm on the second region in the first image, so as to obtain a second image, where a rendering resolution of the first rendering algorithm is greater than a rendering resolution of the second rendering algorithm;

S54: displaying the second image.

The image display method according to the embodiments of the present disclosure may be conducted at a display device end, and achieves the fixation point rendering effects by performing different rendering algorithms on different display regions at the display device, thereby reducing the data transmission amount of the host (for example, a central processing unit (CPU) of a computer), and increasing a refresh frequency of a display screen.

For example, at the display device, different rendering algorithms may be performed on different display regions by using a driving chip.

For example, the rendering resolution of the first rendering algorithm may be a full rendering resolution. Therefore, the first region may be displayed in high-definition. For example, in the first region, each sub-pixel may be rendered with one data signal. The rendering resolution of the second rendering algorithm is less than the rendering resolution of the first rendering algorithm. For example, in the second region, every two identical sub-pixels may be rendered with the same one data signal. But the present disclosure is not limited thereto, in the second region, every plural identical sub-pixels may be rendered with the same one data signal.

For example, as shown in FIG. 2A, the first image 20 may include a first region 21 and a second region 22. The first image 20 may have a rectangular shape (or other shapes), and the first region 21 may be located at any one corner of the rectangle. In this case, as shown in FIG. 2B, the first image 20 may be divided into four sub-regions. The second region 22 may include a first sub-region B, a second sub-region C and a third sub-region D. The first region 21 may be a fourth sub-region A.

For example, the first sub-region B of the first image 20 is adjacent to the first region 21 (that is, the fourth sub-region A) of the first image 20 in a first direction. The second sub-region C of the first image 20 is adjacent to the first region 21 of the first image 20 in a second direction. The third sub-region D of the first image 20 is not adjacent to the first region 21 of the first image 20. For example, the first direction is perpendicular to the second direction.

It should be noted that in the present disclosure, "adjacent" may mean that the sub-region of the second region 22 (for example, the first sub-region B and the second sub-region C in FIG. 2B) is adjacent to at least one side of the first region 21. "Not adjacent" means that the sub-region in the second region 22 (for example, the third sub-region D in FIG. 2B) is not adjacent to any one side of the first region 21.

For example, the first sub-region B, the second sub-region C and the third sub-region D of the first image 20 may further be divided. For example, in the second direction, the first sub-region B of the first image 20 may further be divided into a plurality of parts which may have the same shape or different shapes. In the first direction, the second sub-region C of the first image 20 may further be divided into a plurality of parts. In the first direction or the second direction, the third sub-region D of the first image 20 may also further be divided into a plurality of parts. In the embodiments of the present disclosure, the division, number and arrangement of each sub-region in the second region 22 are not specifically limited.

For example, the first region 21 of the first image 20 may also be located at any side of the first image 20; or the first region 21 of the first image 20 may also be located in the middle of the first image 20, that is, the first region 21 of the first image 20 is not in contact with sides and corners of the first image 20. In the embodiments of the present disclosure, the specific position of the first region 21 is not limited.

For example, the first image 20 may be divided into four sub-regions. The first region 21 includes one sub-region, and the second region 22 includes three sub-regions.

For example, the first region 21 may be located at any side of the first image 20. In this case, the first region 21 includes one sub-region, and the second region 22 includes three sub-regions. For example, the three sub-regions are the first sub-region B, the second sub-region C and the third sub-region D respectively. The first sub-region B includes two parts, the third sub-region D includes two parts and the second sub-region C only includes one part. Therefore, the first image 20 is divided into six parts.

For example, as shown in FIG. 3, the first region 21 may be located in the middle of the first image 20. In this case, the first region 21 is the fourth sub-region A, the second region 22 may include the first sub-region B, the second sub-region C and the third sub-region D, and the first sub-region B includes a first part B1 and a second part B2; the second sub-region C includes a third part C1 and a fourth part C2; the third sub-region D includes a fifth part D1, a sixth part D2, a seventh part D3 and an eighth part D4. Therefore, the first image 20 is divided into nine parts. It should be noted that each part may further be divided.

It should be noted that, in the following description of the present disclosure, the embodiments of the present disclosure is described by taking a case that the first image is divided into nine parts (that is the example shown in FIG. 3) as an example. However, persons skilled in the art should know that the image display method according to the embodiments of the present disclosure may also be applied to the first image which is divided in other manners.

For example, before performing the step S51, the image display method may further include following steps:

S41: generating an original image;

S42: determining a first region and a second region in the original image;

S43: performing high-definition rendering processing on the first region in the original image, and performing compression rendering processing on the second region in the original image, so as to generate the first image that is compressed;

S44: outputting the first image that is compressed.

For example, as shown in FIG. 4, the original image 10 may be generated by data signals of an image that needs to be displayed. The process of generating the compressed first image 20 based on the original image 10 may be completed in an image processing device. Then, the image processing device transmits the compressed first image 20 to the display device. Thus, the data amount transmitted to the display device by the image processing device is only the data signal amount of the compressed first image 20, thereby reducing the data transmission amount and reducing the power consumption of the image processing device.

It should be noted that in practical applications, the first image 20 may not be displayed. That is, in the image processing device, the data signal of each pixel in the compressed first image 20 may be obtained according to the original image 10, and then the data signals of the first image 20 is transmitted to the display device for subsequent processing.

For example, the image processing device may be a CPU of a computer, a Graphic Processing Unit (GPU), or the like.

For example, in the step S42, the first region and the second region in the original image 10 may be preset, and are fixed during the process of displaying an image. For another example, the first region and the second region in the original image 10 may also change with a gazing direction of human eyes. In this case, the step S42 may include: detecting a line of sight of human eyes; and determining the first region in the original image 10 according to the line of sight of the human eyes. For example, the region other than the first region in the original image 10 is the second region of the original image 10. For example, the first region is the fixation region of human eyes, and the second region is the non-fixation region.

For example, as shown in FIG. 4, the original image 10 may be divided into nine parts. For example, a first region of the original image 10 may be a fourth sub-region A", and a second region of the original image 10 may include a first sub-region B", a second sub-region C" and a third sub-region D", and the first sub-region B", the second sub-region C" and the third sub-region D" are in one-to-one correspondence to the first sub-region B, the second sub-region C and the third sub-region D in the first image 20. The first sub-region B" in the original image 10 is adjacent to the first region (that is, the fourth sub-region A") in the original image 10 in the first direction, the second sub-region C" in the original image 10 is adjacent to the first region in the original image 10 in the second direction, and the third sub-region D" in the original image 10 is not adjacent to the first region in the original image 10. The first sub-region B" includes a first part B"1 and a second part B"2; the second sub-region C" includes a third part C"1 and a fourth part C"2; the third sub-region D" includes a fifth part D"1, a sixth part D"2, a seventh part D"3 and an eighth part D"4.

For example, the nine parts in the first image 20 may be in one-to-one correspondence to the nine parts in the original image 10.

For example, the original image 10 shown in FIG. 4 is taken as an example. In the step S43, performing the compression rendering processing on the second region in the original image 10 may comprise following steps:

S431: in a first direction, compressing the first sub-region B" in the original image 10 according to a ratio of 1/F1;

S432: in a second direction, compressing the second sub-region C" in the original image 10 according to a ratio of 1/F2;

S433: in the first direction, compressing the third sub-region D" in the original image 10 according to the ratio of 1/F1, and in the second direction, compressing the third sub-region D" in the original image 10 according to the ratio of 1/F2.

For example, the compression processing may implemented by using an interpolation algorithm. The interpolation algorithm, for example, may comprise Lagrangian interpolation, Newton interpolation, Hermite interpolation, or the like.

For example, F1 and F2 are both greater than 1. According to actual needs, F1 and F2 may be the same or different, which is not limited herein. For another example, F1 and F2 may be preset, and remain unchanged during the process of displaying an image; or, F1 and F2 may also vary according to a size of the second region in the original image 10. For example, in the case where the data transmission amounts are the same and the original images have the fixed size, with respect to a first original image and a second original image, a size of the first original image is the same as that of the second original image (for example, 720×1080), but a fixation region of the first original image is different from that of the second original image. That is, a size of a first region in the first original image is different from a size of a first region in the second original image. For example, if the size of the first region in the first original image is less than the size of the first region in the second original image, i.e., a size of a second region in the first original image is larger than a size of a second region in the second original image, in the above-mentioned steps S431 to S433, the ratios of 1/F1 and 1/F2 for compressing the second region in the first original image may be larger than the ratios of 1/F1' and 1/F2' for compressing the second region in the second original image respectively, so that the data transmission amount of the first original image and the data transmission amount of the second original image are the same.

For example, the step S433 may be an independent step, but the present disclosure is not limited thereto. The processing on the third sub-region D" in the step S433 may also be implemented in the steps S431 and S432. That is, in the step S431, the first sub-region B" and the third sub-region D" in the original image 10 may be compressed, in the first direction, according to the ratio of 1/F1 simultaneously; in the step S432, the second sub-region C" and the third sub-region D" in the original image 10 may be compressed, in the second direction, according to the ratio of 1/F2 simultaneously.

For example, as shown in FIG. 4, the first rendering algorithm is performed on the first region 21 (that is, the fourth sub-region A) in the first image 20, and the second rendering algorithm is performed on the second region 22 (that is, respective parts of B1, B2, C1, C2, D1, D2, D3 and D4) in the first image 20, so as to obtain the second image 30. The second image 30, for example, may also include nine parts which are in one-to-one correspondence to the nine parts in the first image 20. For example, the fourth sub-region A in the first image 20 can be processed according to the first rendering algorithm, to obtain the fourth sub-region A' in the second image 30. The first sub-region B, the second sub-region C and the third sub-region D in the first image 20 can be processed according to the second rendering algorithm, to obtain the first sub-region B', the second sub-region C' and the third sub-region D' in the second image 30 respectively. For example, the first part B1, the second part B2, the third part C1, the fourth part C2, the fifth part D1, the sixth part D2, the seventh part D3 and the eighth part D4 in the first image 20 correspond to the first part B'1, the second part B'2, the third part C'1, the fourth part C'2, the fifth part D'1, the sixth part D'2, the seventh part D'3 and the eighth part D'4 in the second image 30 respectively.

For example, in the original image 10, two parts (that is, the first part B"1 and the second part B"2) in the first sub-region B" may be compressed according to different ratios, or may also be compressed according to the same ratio. For example, in the first direction, the first part B"1 is compressed according to the ratio of 1/T1, the second part B"2 is compressed according to the ratio of 1/T2, T1 and T2 both are greater than 1. Similarly, the two parts in the second sub-region C" may be compressed according to different ratios, or may also be compressed according to the same ratio; and the four parts in the third sub-region D" may be compressed according to different ratios, or may also be compressed according to the same ratio.

It should be noted that in the first direction, the compression ratios of the first part B"1, the fifth part D"1 and the sixth part D"2 in the original image 10 may be the same; the compression ratios of the second part B"2, the seventh part D"3 and the eighth part D"4 in the original image 10 may be the same. In the second direction, the compression ratios of the third part C"1, the fifth part D"1 and the seventh part D"3 in the original image 10 may be the same; and the compression ratios of the fourth part C"2, the sixth part D"2 and the eighth part D"4 in the original image 10 may be the same.

For example, the fourth sub-region A" in the original image 10, the fourth sub-region A in the first image 20, and the fourth sub-region A' in the second image 30 have the same shape. The size (for example, in pixels) of each part in the second region in the first image 20 is less than the size (for example, in pixels) of each corresponding part in the second region in the second image 30. For example, a physical size of each part in the second region in the original image 10 may be the same as a physical size of each corresponding part in the second region in the second image 30.

For example, the first image 20 may be a 2K*2K compressed image, and the second image 30 may be a 2K*4K display image. Thus, this image display method can achieve fixation point rendering effects, reduce the data transmission amount and increase the refresh rate by only inputting the 2K*2K data signal, and displaying an image on a 2K*4K BV3 display module through adopting rendering algorithms based on regions. It should be noted that the above-mentioned 2K*2K and 2K*4K represent the number of pixels.

It should be noted that the first rendering algorithm and the second rendering algorithm represent the processing on the data signal of the sub-pixel in each region of the first image 20.

For example, the first region and the second region in the first image 20 correspond to the first region and the second region of the original image 10 respectively. Thus, the first region 21 and the second region 22 in the first image 20 may also be preset, and remain unchanged during the process of displaying an image. Or, the first region 21 and the second region 22 in the first image 20 may also vary with the gazing direction of human eyes. In this case, the first region 21 may be, for example, the fixation region, and the second region 22 may be the non-fixation region. Therefore, this image display method can implement the fixation point display.

For example, the first image 20 may have a resolution of 2K, and the second image 30 have a resolution of 4K. For example, the resolution of the second region in the first image 20 is less than that of the second region in the second image 30. It should be noted that the above-mentioned "resolution" for example, represents a visual resolution.

For example, sub-pixels in the first image 20 may be arranged according to a standard RGB array arrangement manner; but sub-pixels in the second image 30 are arranged according to a Bright View 3 (BV3) array arrangement manner. The BV3 array arrangement manner is a delta array arrangement manner, and may increase the visual resolution and improve the image quality.

Figure 5A:
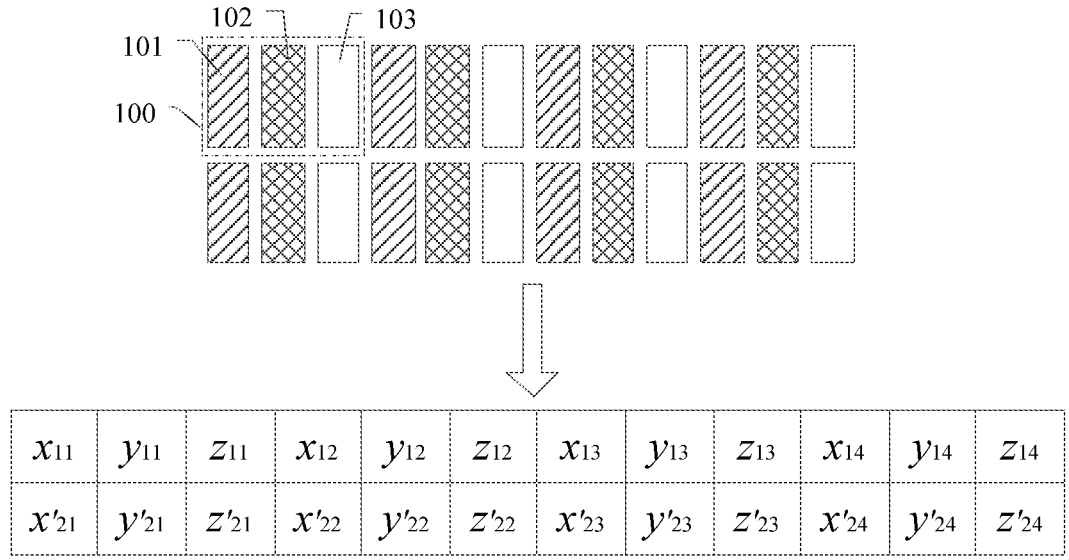
FIG. 5A is a local schematic diagram of a first region in a first image according to an embodiment of the present disclosure.
Figure 5B:
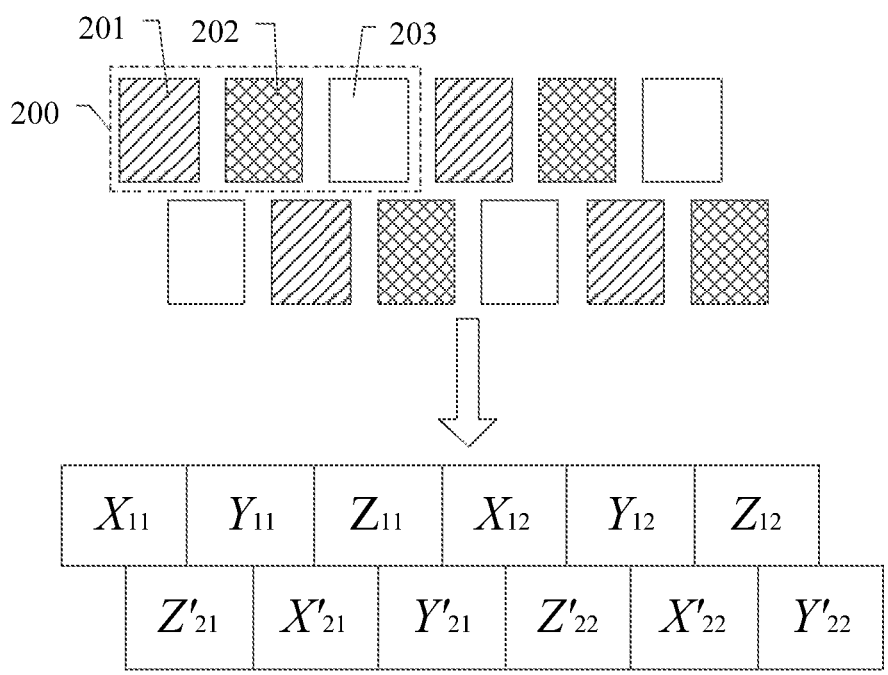
FIG. 5B is a local schematic diagram of a first region in a second image according to an embodiment of the present disclosure.

FIG. 5A is a local schematic diagram of a first region in a first image according to an embodiment of the present disclosure; and FIG. 5B is a local schematic diagram of a first region in a second image according to an embodiment of the present disclosure.

For example, in the step S53, performing the first rendering algorithm on the first region 21 in the first image includes: performing pixel conversion on pixels of odd-numbered rows in the first region 21 in the first image by using a first conversion formula; and performing the pixel conversion on pixels of even-numbered rows in the first region 21 in the first image by using a second conversion formula.

For example, during the rendering processing, the physical size of the first region 21 of the first image 20 is unchanged. That is, the shapes and physical sizes of the first region 21 of the first image 20 and the first region of the second image 30 may be the same.

For example, in the first region of the second image 30, all the pixels are arranged according to the BV3 array arrangement manner.

For example, the first region in the second image shown in FIG. 5B corresponds to the first region in the first image shown in FIG. 5A. That is, the first region in the first image shown in FIG. 5A is subjected to rendering conversion according to the first conversion formulae and the second conversion formulae, so as to obtain the first region in the second image shown in FIG. 5B.

For example, as shown in FIG. 5A, the first region 21 in the first image 20 includes a plurality of pixels 100, and each pixel 100 at least includes a first sub-pixel 101, a second sub-pixel 102 and a third sub-pixel 103. For example, the first sub-pixel 101, the second sub-pixel 102 and the third sub-pixel 103 in the first region 21 of the first image 20 may be a red sub-pixel, a green sub-pixel and a blue sub-pixel respectively. For another example, each pixel 100 may further include a fourth sub-pixel, and the fourth sub-pixel may be a white sub-pixel.

It should be noted that the first sub-pixel 101, the second sub-pixel 102 and the third sub-pixel 103, for example, may also be a yellow sub-pixel, a magenta sub-pixel and a cyan sub-pixel respectively. The present disclosure is not limited thereto.

For example, as shown in FIG. 5B, the first region in the second image 30 may include a plurality of pixels 200, each pixel 200 may also at least include a first sub-pixel 201, a second sub-pixel 202 and a third sub-pixel 203. Correspondingly, the first sub-pixel 201, the second sub-pixel 202 and the third sub-pixel 203 in the first region of the second image 30 may correspond to the first sub-pixel 101, the second sub-pixel 102 and the third sub-pixel 103 in the first region of the first image 20 respectively. For example, the first sub-pixel 201, the second sub-pixel 202 and the third sub-pixel 203 in the first region of the second image 30 may also be a red sub-pixel, a green sub-pixel and a blue sub-pixel respectively.

For example, the first conversion formula may be expressed as:

$$X_{j_1\left(\frac{i_1+1}{2}\right)} = \alpha_{j_11}x_{j_1i_1} + \alpha_{j_12}x_{j_1(i_1+1)},$$

$$Y_{j_1\left(\frac{i_1+1}{2}\right)} = \beta_{j_11}y_{j_1i_1} + \beta_{j_12}y_{j_1(i_1+1)},$$

$$Z_{j_1\left(\frac{i_1+1}{2}\right)} = \gamma_{j_11}z_{j_1i_1} + \gamma_{j_12}z_{j_1(i_1+1)},$$

where $i_1$ and $j_1$ are both integers, and $i_1=1, 3, 5, \ldots, n_1-1$ is used to represent the column number of odd-numbered rows (for example, the column number of odd-numbered rows in the first region of the first image), $j_1=1, 3, 5, \ldots, m_1-1$ is used to represent the row number of odd-numbered rows (for example, the row number of odd-numbered rows in the first region of the first image), $n_1$ and $m_1$ are both positive integers, and $$X_{j_1\left(\frac{i_1+1}{2}\right)}, Y_{j_1\left(\frac{i_1+1}{2}\right)} \text{ and } Z_{j_1\left(\frac{i_1+1}{2}\right)}$$

respectively represent the data signals of the first sub-pixel 201, the second sub-pixel 202 and the third sub-pixel 203 of the $j_1$-th row and the $$\frac{i_1+1}{2}$$

-th column in the first region of the second image 30. $x_{j_1i_1}$, $y_{j_1i_1}$ and $z_{j_1i_1}$ respectively represent the data signals of the first sub-pixel 101, the second sub-pixel 102 and the third sub-pixel 103 of the $j_1$-th row and the $i_1$-th column in the first region of the first image 20. $x_{j_1(i_1+1)}$, $y_{j_1(i_1+1)}$ and $z_{j_1(i_1+1)}$ respectively represent the data signals of the first sub-pixel 101, the second sub-pixel 102 and the third sub-pixel 103 of the $j_1$-th row and the $(i_1+1)$-th column in the first region of the first image 20. $\alpha_{j_11}$ and $\alpha_{j_12}$ represent conversion coefficients of the first sub-pixels 101 of the $j_1$-th row in the first region of the first image, $\beta_{j_11}$ and $\beta_{j_12}$ represent conversion coefficients of the second sub-pixels 102 of the $j_1$-th row in the first region of the first image, $\gamma_{j_11}$ and $\gamma_{j_12}$ represent conversion coefficients of the third sub-pixels 103 of the $j_1$-th row in the first region of the first image, and $\alpha_{j_11}+\alpha_{j_12}=1$, $\beta_{j_11}+\beta_{j_12}=1$, $\gamma_{j_11}+\gamma_{j_12}=1$.

For example, the second conversion formula may be expressed as:

$$X'_{j_2\left(\frac{i_2+1}{2}\right)} = \alpha_{j_23}x'_{j_2(i_2+1)} + \alpha_{j_24}x'_{j_2(i_2+2)}, X'_{j_2\frac{n_2}{2}} = x'_{j_2n_2},$$

$$i_2 = 1, 3, 5, \ldots, n_2-3, j_2 = 2, 4, 6, \ldots, m_1,$$

$$Y'_{j_2\left(\frac{i_2+1}{2}\right)} = \beta_{j_23}y'_{j_2(i_2+1)} + \beta_{j_24}y'_{j_2(i_2+2)}, Y'_{j_2\frac{n_2}{2}} = y'_{j_2n_2},$$

$$i_2 = 1, 3, 5, \ldots, n_2-3, j_2 = 2, 4, 6, \ldots, m_1,$$

$$Z'_{j_2\left(\frac{i_2+1}{2}\right)} = \gamma_{j_23}z'_{j_2(i_2+1)} + \gamma_{j_24}z'_{j_2(i_2+2)}, Z'_{j_2\frac{n_2}{2}} = z'_{j_2n_2},$$

$$i_2 = 1, 3, 5, \ldots, n_2-3, j_2 = 2, 4, 6, \ldots, m_1,$$

where $i_2$, $j_2$ and $n_2$ are all positive integers, and $i_2$ is used to represent the column number of the even-numbered rows (for example, the column number of the even-numbered rows in the first region of the first image), $j_2$ is used to represent the row number of even-numbered rows (for example, the row number of even-numbered rows in the first region of the first image), $n_2$ represents the total number of columns of the pixels of the $j_2$-th row;

$$X'_{j_2\left(\frac{i_2+1}{2}\right)}, Y'_{j_2\left(\frac{i_2+1}{2}\right)}, \text{ and } Z'_{j_2\left(\frac{i_2+1}{2}\right)}$$

respectively represent the data signals of the first sub-pixel 201, the second sub-pixel 202 and the third sub-pixel 203 of the $j_2$-th row and the $$\frac{i_2+1}{2}$$

-th column in the first region of the second image 30, $$X'_{j_2\left(\frac{n_2}{2}\right)} \text{ and } Y'_{j_2\left(\frac{n_2}{2}\right)}$$

respectively represent the data signals of the first sub-pixel 201 and the second sub-pixel 202 of the $j_2$-th row and the $$\frac{n_2}{2}$$

-th column in the first region of the second image 30, $Z'_{j_21}$ represents the data signal of the third sub-pixel 203 of the $j_2$-th row and the first column in the first region of the second image 30. $x'_{j_2(i_2+1)}$, $x'_{j_2(i_2+2)}$ and $x'_{j_2n_2}$ respectively represent the data signals of the first sub-pixels 101 of the $j_2$-th row and the $(i_2+1)$-th column, the $j_2$-th row and the $(i_2+2)$-th column, and the $j_2$-th row and the $n_2$-th column in the first region of the first image 20. $y'_{j_2(i_2+1)}$, $y'_{j_2(i_2+2)}$ and $y'_{j_2n_2}$ respectively represent the data signals of the second sub-pixels 102 of the $j_2$-th row and the $(i_2+1)$-th column, the $j_2$-th row and the $(i_2+2)$-th column, and the $j_2$-th row and the $n_2$-th column in the first region of the first image 20. $z'_{j_2(i_2-1)}$, $z'_{j_2i_2}$ and $z'_{j_21}$ respectively represent the data signals of the third sub-pixels 103 of the $j_2$-th row and the $(i_2-1)$-th column, the $j_2$-th row and the $i_2$-th column, and the $j_2$-th row and the first column in the first region of the first image 20. $\alpha_{j_23}$ and $\alpha_{j_24}$ represent conversion coefficients of the first sub-pixels 101 of the $j_2$-th row in the first region of the first image, $\beta_{j_23}$ and $\beta_{j_24}$ represent conversion coefficients of the second sub-pixels 102 of the $j_2$-th row in the first region of the first image $\gamma_{j_23}$ and $\gamma_{j_24}$ represent conversion coefficients of the third sub-pixels 103 of the $j_2$-th row in the first region of the first image, and $\alpha_{j_23}+\alpha_{j_24}=1$, $\beta_{j_23}+\beta_{j_24}=1$, $\gamma_{j_23}+\gamma_{j_24}=1$.

For example, in the first image 20, the conversion coefficients $\alpha_{j_11}$ and $\alpha_{j_12}$ of the first sub-pixels 101 of respective odd-numbered rows may be different or the same; the conversion coefficients $\beta_{j_11}$ and $\beta_{j_12}$ of the second sub-pixels 102 of respective odd-numbered rows may be different or the same; the conversion coefficients $\gamma_{j_11}$ and $\gamma_{j_12}$ of the third sub-pixels 103 of respective odd-numbered rows may be different or the same. Similarly, in the first image 20, for the conversion coefficients of each sub-pixel of respective even-numbered rows, $\alpha_{j_23}$ and $\alpha_{j_24}$ may be different or the same; $\beta_{j_23}$ and $\beta_{j_24}$ may be different or the same; $\gamma_{j_23}$ and $\gamma_{j_24}$ may be different or the same.

For example, the conversion coefficients of $\alpha_{j_11}$, $\alpha_{j_12}$, $\alpha_{j_23}$, $\alpha_{j_24}$, $\beta_{j_11}$, $\beta_{j_12}$, $\beta_{j_23}$, $\beta_{j_24}$, $\gamma_{j_11}$, $\gamma_{j_12}$, $\gamma_{j_23}$ and $\gamma_{j_24}$ may have an initial value of 0.5. The conversion coefficients of $\alpha_{j_11}$, $\alpha_{j_12}$, $\alpha_{j_23}$, $\alpha_{j_24}$, $\beta_{j_11}$, $\beta_{j_12}$, $\beta_{j_23}$, $\beta_{j_24}$, $\gamma_{j_11}$, $\gamma_{j_12}$, $\gamma_{j_23}$ and $\gamma_{j_24}$ may be preset according to empirical values. The conversion coefficients $\alpha_{j_11}$ and $\alpha_{j_12}$ respectively represent a weight of the data signal $x_{j_1i_1}$ of the first sub-pixel 101 of the $j_1$-th row and the $i_1$-th column and a weight of the data signal $x_{j_1(i_1+1)}$ of the first sub-pixel 101 of the $j_1$-th row and the $(i_1+1)$-th column in the first region of the first image 20. For example, in the above-mentioned formula, the conversion coefficients $\alpha_{j_11}$ and $\alpha_{j_12}$ may be determined according to areas and a relative positional relationship of the first sub-pixel 101 of the j i-th row and the i-th column and the first sub-pixel 101 of the $j_1$-th row and the $(i_1+1)$-th column in the first region of the first image 20 respectively. Similarly, $\alpha_{j_23}$, $\alpha_{j_24}$, $\beta_{j_11}$, $\beta_{j_12}$, $\beta_{j_23}$, $\beta_{j_24}$, $\gamma_{j_11}$, $\gamma_{j_12}$, $\gamma_{j_23}$ and $\gamma_{j_24}$ are weights of respective sub-pixels respectively.

For example, in the first image 20, $m_1$ represents the total number of rows of the pixels of the first region, $n_1$ represents the total number of columns of the pixels in the $j_1$-th row in the first region, and $n_2$ represents the total number of columns of the pixels in the $j_2$-th row in the first region. For example, $n_1$ and $n_2$ may be equal, so that the first region comprises an $m_1 \ast n_1$ (or $n_2$) pixel array.

For example, $m_1$, $n_1$ and $n_2$ are all positive integers, and $n_1$ and $n_2$ are both even numbers.

For example, the data signal may represent a grayscale luminance, i.e., a luminous intensity.

For example, the shape of the first region may be a rectangle, and may also be a circle, a trapezoid, a polygon, or the like. For example, image filtering may be performed on an edge of the first region, such that the shape of the first region is a circle, a trapezoid, a polygon, or the like. For example, the image filtering can adopt a filtering function such as smoothing filtering and Gaussian filtering.

For example, as shown in FIGS. 5A and 5B, in a local schematic diagram, in the first region of the first image 20, each row includes four pixels 100; in the first region of the second image 30, each row includes two pixels 200. That is, the four pixels 100 in each row of the first image 20 may be converted into two pixels 200 in each row of the second image 30.

For example, in a row direction, a pixel width of each sub-pixel in the first region of the second image 30 is greater than a pixel width of each corresponding sub-pixel in the first region of the first image 20; in a column direction, a pixel length of each sub-pixel in the first region of the second image 30 is equal to a pixel length of each corresponding sub-pixel in the first region of the first image 20. For example, in one example, the pixel width of each sub-pixel in the first region of the second image 30 is twice the pixel width of each sub-pixel in the first region of the first image 20.

For example, as shown in FIG. 5A and FIG. 5B, in a specific example, the conversion relationship between each pixel 100 in the first region of the first image 20 and each pixel 200 in the first region of the second image 30 may be expressed as follows:

For pixels of a first row in the first region of the second image 30 (pixels in odd-numbered rows, using the first conversion formula):

$X_{11}=\alpha_{11}x_{11}+\alpha_{12}x_{12}, Y_{11}=\beta_{11}y_{11}+\beta_{12}y_{12}, Z_{11}=\gamma_{11}z_{11}+\gamma_{12}z_{12}$ $X_{12}=\alpha_{11}x_{13}+\alpha_{12}x_{14}, Y_{12}=\beta_{11}y_{13}+\beta_{12}y_{14}, Z_{12}=\gamma_{11}z_{13}+\gamma_{12}z_{14}$ For pixels in a second row in the first region of the second image 30 (pixels in even-numbered rows, using the second conversion formula):

$X'_{21}=\alpha_{23}x'_{22}+\alpha_{24}x'_{23}, Y'_{21}=\beta_{23}y'_{22}+\beta_{24}y'_{23}, Z'_{21}z'_{21}$ $X'_{22}=x'_{24}, Y'_{22}=y'_{24}, Z'_{22}=\gamma_{24}z'_{22}+\gamma_{23}z'_{23}$ To sum up, the first region of the first image 20 having the RBG array arrangement mode is converted into the first region of the second image 30 having the BV3 array arrangement mode.

Figure 6A:
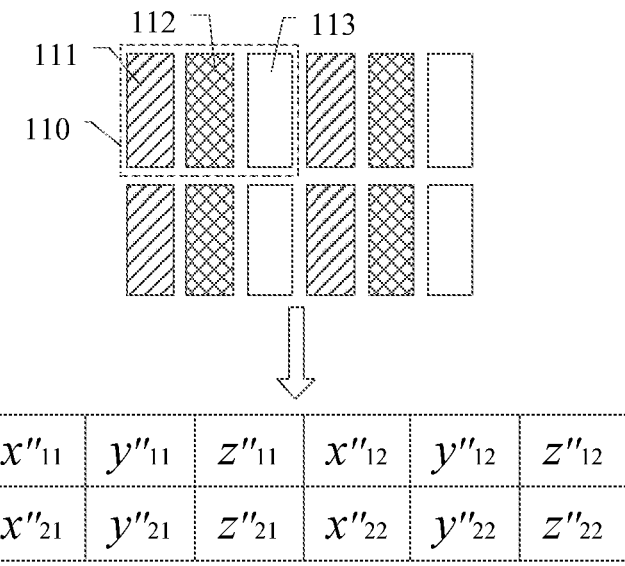
FIG. 6A is a local schematic diagram of a second region in a first image according to an embodiment of the present disclosure.
Figure 6B:
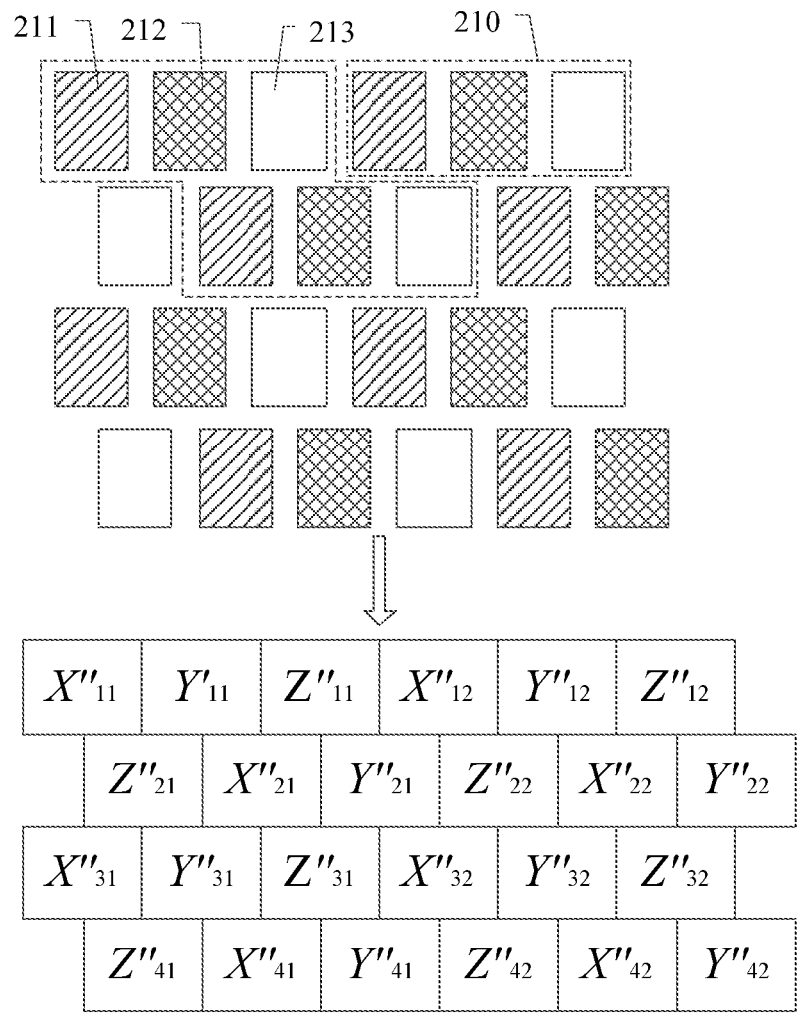
FIG. 6B is a local schematic diagram of a second region in a second image according to an embodiment of the present disclosure.

FIG. 6A is a local schematic diagram of a second region in a first image according to an embodiment of the present disclosure; FIG. 6B is a local schematic diagram of a second region in a second image according to an embodiment of the present disclosure.

For example, the first image 20 shown in FIG. 4 is taken as an example. In the step S53, performing the second rendering algorithm on the second region may include following steps:

S5301: in the first direction, expanding the first sub-region B in the first image 20 according to a ratio of F1/2, and in the second direction, compressing the first sub-region B in the first image 20 according to a ratio of 1/2;

S5302: in the second direction, expanding the second sub-region C in the first image 20 according to a ratio of F2/2, and in the first direction, compressing the second sub-region C in the first image 20 according to a ratio of 1/2;

S5303: in the first direction, expanding the third sub-region D in the first image 20 according to the ratio of F1/2, and in the second direction, expanding the third sub-region D in the first image 20 according to a ratio of F2/2.

For example, the expansion processing may also use an interpolation algorithm.

For example, the expansion processing in the step S53 corresponds to the compression processing in the step S43. That is, the direction of the expansion processing in the step S53 corresponds to the direction of the compression processing in the step S43. For example, in the step S43, the first sub-region B" in the original image 10 is compressed, in the first direction, according to a ratio of 1/F1, then in the step S53, the first sub-region B in the first image 20 is expanded, in the first direction, according to a ratio of F1/2.

For example, in the step S53, after the expansion processing and the compression processing are performed on the second region in the first image 20, performing a second rendering algorithm on the second region in the first image 20 further includes performing pixel conversion on pixels of the second region in the first image by using a third conversion formula.

For example, as shown in FIG. 6A, the second region 21 in the first image 20 includes a plurality of pixels 110, and each pixel 110 at least includes a first sub-pixel 111, a second sub-pixel 112 and a third sub-pixel 113. For example, as shown in FIG. 6B, the second region in the second image 30 may include a plurality of pixels 210, and each pixel 210 may also at least include a first sub-pixel 211, a second sub-pixel 212 and a third sub-pixel 213. For example, the first sub-pixel 111, the second sub-pixel 112 and the third sub-pixel 113 in the second region 21 of the first image 20 may be a red sub-pixel, a green sub-pixel and a blue sub-pixel respectively. Correspondingly, the first sub-pixel 211, the second sub-pixel 212 and the third sub-pixel 213 in the second region of the second image 30 may also be a red sub-pixel, a green sub-pixel and a blue sub-pixel respectively.

For example, after the data signals of all pixels in the second region of the first image 20 are converted by using the third conversion formula, the pixels may be arranged in a corresponding region of the display device in a Smart View arrangement manner for displaying.

For example, the third conversion formula may be expressed as:

$$X''_{(2k-1)l} = X''_{(2k)l} = x''_{kl},$$

$$Y''_{(2k-1)l} = Y''_{(2k)l} = y''_{kl},$$

$$Z''_{(2k-1)l} = Z''_{(2k)(l+1)} = z''_{kl},$$

where k and l are both integers, and k=1, 2, 3, ..., $M_2$ is used to represents the number of rows (for example, the number of rows of each sub-region of the second region in the first image), l=1, 2, 3, ..., $n_3$ is used to represents the number of columns (for example, the number of columns of each sub-region of the second region in the first image), $X''_{(2k-1)l}$, $Y''_{(2k-1)l}$ and $Z''_{(2k-1)l}$ respectively represent the data signals of the first sub-pixel 211, the second sub-pixel 212 and the third sub-pixel 213 of the (2k−1)-th row and the l-th column in each sub-region of the second region in the second image 30. $X''_{(2k-1)l}$ and $Y''_{(2k-1)l}$ respectively represent the data signals of the first sub-pixel 211 and the second sub-pixel 212 of the (2k)-th row and the l-th column in each sub-region of the second region in the second image 30. $Z''_{(2k)(l+1)}$ represents the data signal of the third sub-pixel 213 of the (2k)-th row and the (l+1)-th column in each sub-region of the second region in the second image 30. $x''_{kl}$, $y''_{kl}$ and $z''_{kl}$ respectively represent data signals of the first sub-pixel 111, the second sub-pixel 112 and the third sub-pixel 113 of the k-th row and the l-th column in each sub-region of the second region in the first image.

For example, $m_2$ and $n_3$ are both positive integers. $n_3$ represents the total number of columns of the pixels in the k-th row, and $m_2$ represents the total number of rows of pixels in the first sub-region, the second sub-region or the third sub-region in the second region of the first image.

For example, in the first image 20, $m_2$ represents the total number of rows of pixels in a certain sub-region (or a certain part of a certain sub-region) in the second region. For example, when the pixel conversion is performed on the first part B1 in the first sub-region B, $m_2$ represents the total number of rows of pixels in the first part B1; when the pixel conversion is performed on the third part C1 in the second sub-region C, $m_2$ represents the total number of rows of pixels in the third part C1, and so on. $n_3$ represents the total number of columns of pixels in the k-th row of a certain sub-region (or a certain part of a certain sub-region) in the second region. For example, for each sub-region of the second region, $n_3$ may be the same or different; $m_2$ may be the same or different. As shown in FIG. 4, for the first part B1 and the second part B2 in the first sub-region B, the total numbers $n_3$ of columns of pixels may be the same, but the total numbers $m_2$ of rows of the pixels are different. For the third part C1 and the fourth part C2 in the second sub-region C, the total numbers $n_3$ of columns of pixels may be different, but the total numbers $m_2$ of rows of pixels are the same.

For example, as shown in FIGS. 6A and 6B, in a local schematic diagram, the second region of the first image 20 includes four pixels 110 in two rows and two columns. The second region of the second image 30 includes eight pixels 20 in four rows and two columns That is, the two pixels 110 in one row in the first image 20 may be converted into four pixels 210 in two rows in the second image 30. For example, in the row direction, the pixel width of each sub-pixel in the second region of the second image 30 is greater than the pixel width of each corresponding sub-pixel in the second region of the first image 20. In the column direction, the pixel length of each sub-pixel in the second region of the second image 30 is equal to the pixel length of each corresponding pixel in the second region of the first image 20. For example, in an example, the pixel width of each sub-pixel in the second region of the second image 30 is twice the pixel width of each sub-pixel in the second region of the first image 20.

For example, sub-pixels in the second region of the second image 30 are also arranged according to a BV3 array arrangement manner.

For example, as shown in FIGS. 6A and 6B, in a specific example, the conversion relationship between each pixel 110 in the second region of the first image 20 and each pixel 210 in the second region of the second image 30 may be expressed as follows:

For pixels of a first row and a second row in the second region of the second image 30:

$$X''_{11} = X''_{21} = x''_{11}, Y''_{11} = Y''_{21} = y''_{11}, Z''_{11} = Z''_{22} = z''_{11}$$

$$X''_{12} = X''_{22} = x''_{12}, Y''_{12} = Y''_{22} = y''_{12}, Z''_{12} = z''_{12}$$

For pixels of a third row and a fourth row in the second region of the second image 30:

$$X''_{31} = X''_{41} = x''_{21}, Y''_{31} = Y''_{41} = y''_{21}, Z''_{31} = Z''_{42} = z''_{21}$$

$$X''_{32} = X''_{42} = x''_{22}, Y''_{32} = Y''_{42} = y''_{32}, Z''_{32} = z''_{22}$$

For example, for a sub-pixel arranged in a first column of the even-numbered row in the second region of the second image 30, data signals $Z''_{21}$ and $Z''_{41}$ of the sub-pixel may be preset. For example, $Z''_{21}=0$, $Z''_{41}=0$.

To sum up, the second region of the first image 20 having the RBG array arrangement mode is converted into the second region of the second image 30 having the BV3 array arrangement mode.

For example, if the first sub-pixel 211, the second sub-pixel 212 and the third sub-pixel 213 represent a red sub-pixel R, a green sub-pixel G and a blue sub-pixel B respectively, then, in the second image 30, when sub-pixels of each odd-numbered row are arranged in an order of RGBRGB, sub-pixels of each even-numbered row are arranged in an order of BRGBRG. However, the present disclosure is not limited thereto. In the second image 30, for example, when the sub-pixels of each odd-numbered row are arranged in an order of GBRGBR, the sub-pixels of each even-numbered row are arranged in an order of RGBRGB.

For example, in the step S54, the pixels of the second image obtained after performing the first rendering algorithm and the second rendering algorithm on the first image are arranged on the display device according to the BV3 array arrangement mode, so as to display the second image.

Figure 7:
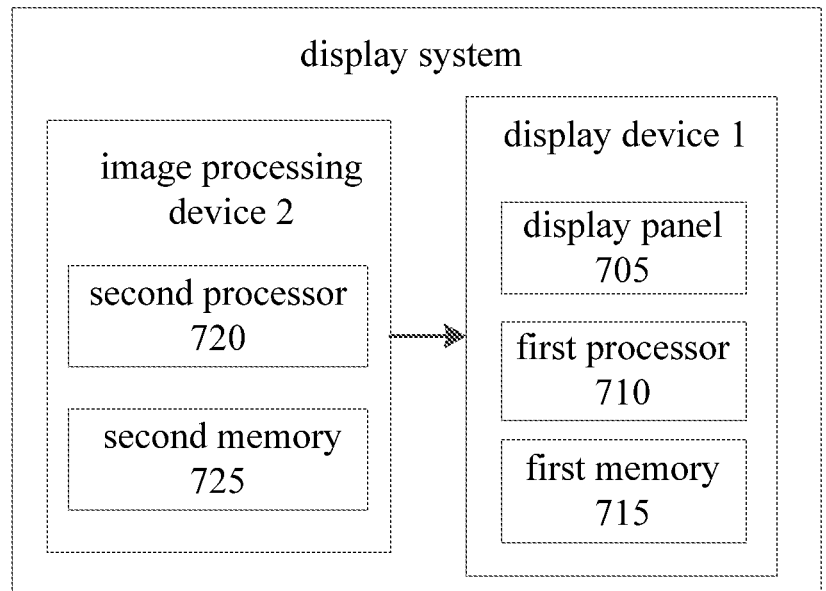
FIG. 7 is a schematic block diagram of a display system according to an embodiment of the present disclosure.

FIG. 7 is a schematic block diagram of a display system according to an embodiment of the present disclosure.

For example, as shown in FIG. 7, a display system provided by the embodiment of the present disclosure includes a display device 1 and an image processing device 2. The display device 1 includes a display panel 705, a first processor 710 and a first memory 715. The image processing device 2 includes a second processor 720 and a second memory 725. It should be noted that the components of the display system shown in FIG. 7 are merely illustrative, and not limitative. According to actual application requirement, the display system may further have other components.

For example, information transmission may be performed between the display device 1 and the image processing device 2 via a network.

For example, the network may include a wireless network, a wired network, and/or any combination of the wireless network and the wired network. The network may include a local area network, an internet, a telecommunication network, an Internet of Things based on the internet and/or telecommunication network, and/or any combinations of the above networks, or the like. For example, the wired network may communicate by means such as a twisted pair, coaxial cable or optical fiber transmission. The wireless network may communicate by means such as 3G/4G/5G mobile communication networks, Bluetooth, Zigbee or WiFi. The types and functions of the network are not limited in the present disclosure.

For example, the components in the display device 1 may be interconnected by a bus system and/or a connection mechanism (not shown) in other forms, so as to implement information transmission. The components in the image processing device 2 may also be interconnected by a bus system and/or a connection mechanism (not shown) in other forms, so as to implement information transmission.

For example, the first processor 710 may be disposed on a driving chip of the display device 1. The first processor 710 is a processing unit having the data processing ability and/or program execution ability. The first processor 710 may control other components in the display device 1 to perform desired functions.

For example, the second processor 720 may be a central processing unit (CPU) or other forms of processing unit having data processing capabilities and/or program execution capabilities, such as a graphics processing unit (GPU), a field-programmable gate array (FPGA), a tensor processing unit (TPU), or the like. The second processor 720 may control other components in the image processing device 2 to perform desired functions. For another example, the central processing unit (CPU) may be an X86, ARM architecture, or the like.

For example, the first memory 715 and the second memory 725 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. Various applications, various data such as the conversion coefficients, and various data used and/or generated by the applications, and the like, may also be stored in the computer-readable storage medium.

For example, one or more first computer instructions may be stored on the first memory 715. The first processor 710 may execute the first computer instruction, so as to implement various functions (for example, the first rendering algorithm and the second rendering algorithm). One or more second computer instructions may also be stored on the second memory 725. The second processor 720 may execute the second computer instructions, so as to implement various functions (for example, generating a compressed first image, or the like).

For example, the display panel 705 is configured to display a second image. The display panel may be a liquid crystal display (LCD) panel, an organic light-emitting diode display (OLED) panel, or the like.

For example, when the first computer instruction is executed by the first processor 710, following steps may be implemented: acquiring a compressed first image; determining a first region and a second region in the first image; performing a first rendering algorithm on the first region in the first image and performing a second rendering algorithm on the second region in the first image, so as to obtain a second image, where the rendering resolution of the first rendering algorithm is greater than the rendering resolution of the second rendering algorithm; and displaying the second image on the display panel.

For example, sub-pixels in the first image may be arranged according to a standard RGB array arrangement manner; sub-pixels in the second image are arranged according to a Bright View 3 (BV3) array arrangement manner.

For example, the resolution of the second region in the first image is less than that of the second region in the second image.

For example, in an example, when the first computer instruction is executed by the first processor 710, following steps may also be implemented: performing pixel conversion on pixels of odd-numbered rows in the first region in the first image by using a first conversion formula; and performing the pixel conversion on pixels of even-numbered rows in the first region in the first image by using a second conversion formula.

For example, the first region in the first image includes a plurality of pixels, and each of the pixels at least includes a first sub-pixel, a second sub-pixel and a third sub-pixel. It should be noted that, for a detail description of each pixel, reference may be made to the related description in the embodiments of the image display method, and the repetitions are not described herein again.

For example, the first conversion formula may be expressed as:

$$X_{j_1(\frac{i_1+1}{2})} = \alpha_{j_1 1} x_{j_1 i_1} + \alpha_{j_1 2} x_{j_1 (i_1+1)},$$

$$Y = \beta_{j_1 1} y_{j_1 i_1} j_1\left(\frac{i_1+1}{2}\right) + \beta_{j_1 2} y_{j_1 (i_1+1)},$$

$$Z_{j_1(\frac{i_1+1}{2})} = \gamma_{j_1 1} z_{j_1 i_1} + \gamma_{j_1 2} z_{j_1 (i_1+1)},$$

where $i_1$, $j_1$, $n_1$ and $m_1$ are integers, and $i_1=1, 3, 5, \ldots$, $n_1-1$ is used to represent the column number of odd-numbered rows, $j_1=1, 3, 5, \ldots$, $m_1-1$ is used to represent the row number of odd-numbered rows, $n_1$ represents the total number of columns of pixels in the $j_1$-th row, $m_1$ represents the total number of rows of pixels in the first region of the first image, $$X_{j_2(\frac{i_2+1}{2})}, Y_{j_2(\frac{i_2+1}{2})}, \text{ and } Z_{j_2(\frac{i_2+1}{2})}$$

respectively represent the data signals of the first sub-pixel, the second sub-pixel and the third sub-pixel of the $j_1$-th row and the $\frac{i_1+1}{2}$ -th column in the first region of the second image 30. $x_{j_1 i_1}$, $y_{j_1 i_1}$ and $z_{j_1 i_1}$ respectively represent the data signals of the first sub-pixel, the second sub-pixel and the third sub-pixel of the $j_1$-th row and the $i_1$-th column in the first region of the first image. $x_{j_1(i_1+1)}$, $y_{j_1(i_1+1)}$ and $z_{j_1(i_1+1)}$ respectively represent the data signals of the first sub-pixel, the second sub-pixel and the third sub-pixel of the $j_1$-th row and the $(i_1+1)$-th column in the first region of the first image. $\alpha_{j_1 1}$ and $\alpha_{j_1 2}$ represent conversion coefficients of the first sub-pixels of the $j_1$-th row in the first region of the first image, $\beta_{j_1 1}$ and $\beta_{j_1 2}$ represent conversion coefficients of the second sub-pixels of the $j_1$-th row in the first region of the first image, $\gamma_{j_1 1}$ and $\gamma_{j_1 2}$ represent conversion coefficients of the third sub-pixels of the $j_1$-th row in the first region of the first image, and $\alpha_{j_1 1} + \alpha_{j_1 2} = 1$, $\beta_{j_1 1} + \beta_{j_1 2} = 1$, $\gamma_{j_1 1} + \gamma_{j_1 2} = 1$.

For example, the second conversion formula may be expressed as:

$$X'_{j_2\left(\frac{i_2+1}{2}\right)} = \alpha_{j_2 3} x'_{j_2(i_2+1)} + \alpha_{j_2 4} x'_{j_2(i_2+2)}, X'_{j_2 \frac{n_2}{2}} = x'_{j_2 n_2},$$

$$i_2 = 1, 3, 5, \ldots, n_2 - 3, j_2 = 2, 4, 6, \ldots, m_1,$$

$$Y'_{j_2\left(\frac{i_2+1}{2}\right)} = \beta_{j_2 3} y'_{j_2(i_2+1)} + \beta_{j_2 4} y'_{j_2(i_2+2)}, Y'_{j_2 \frac{n_2}{2}} = y'_{j_2 n_2},$$

$$i_2 = 1, 3, 5, \ldots, n_2 - 3, j_2 = 2, 4, 6, \ldots, m_1,$$

$$Z'_{j_2\left(\frac{i_2+1}{2}\right)} = \gamma_{j_2 3} z'_{j_2(i_2+1)} + \gamma_{j_2 4} z'_{j_2(i_2+2)}, Z'_{j_2 \frac{n_2}{2}} = z'_{j_2 n_2},$$

$$i_2 = 1, 3, 5, \ldots, n_2 - 3, j_2 = 2, 4, 6, \ldots, m_1,$$

where $i_2$, $j_2$ and $n_2$ are all positive integers, and $i_2$ is used to represent the column number of the even-numbered rows, $j_2$ is used to represent the row number of even-numbered rows, $n_2$ represents the total number of columns of the pixels of the $j_2$-th row;

$X'_{j_2\left(\frac{i_2+1}{2}\right)}$, $Y'_{j_2\left(\frac{i_2+1}{2}\right)}$, and $Z'_{j_2\left(\frac{i_2+1}{2}\right)}$ respectively represent the data signals of the first sub-pixel, the second sub-pixel and the third sub-pixel of the $j_2$-th row and the $\frac{i_2+1}{2}$ -th column in the first region of the second image, $X'_{j_2 \frac{n_2}{2}}$ and $Y'_{j_2 \frac{n_2}{2}}$ respectively represent the data signals of the first sub-pixel and the second sub-pixel of the $j_2$-th row and the $\frac{n_2}{2}$ -th column in the first region of the second image, $Z'_{j_2 1}$ represents the data signal of the third sub-pixel of the $j_2$-th row and the first column in the first region of the second image. $x'_{j_2(i_2+1)}$, $x'_{j_2(i_2+2)}$ and $x'_{j_2 n_2}$ respectively represent the data signals of the first sub-pixels of the $j_2$-th row and the $(i_2+1)$-th column, the $j_2$-th row and the $(i_2+2)$-th column, and the $j_2$-th row and the $n_2$-th column in the first region of the first image. $y'_{j_2(i_2+1)}$, $y'_{j_2(i_2+2)}$ and $y'_{j_2 n_2}$ respectively represent the data signals of the second sub-pixels of the $j_2$-th row and the $(i_2+1)$-th column, the $j_2$-th row and the $(i_2+2)$-th column, and the $j_2$-th row and the $n_2$-th column in the first region of the first image. $z'_{j_2(i_2-1)}$, $z'_{j_2 i_2}$ and $z'_{j_2 1}$ respectively represent the data signals of the third sub-pixels of the $j_2$-th row and the $(i_2-1)$-th column, the $j_2$-th row and the $i_2$-th column, and the $j_2$-th row and the first column in the first region of the first image. $\alpha_{j_2 3}$ and $\alpha_{j_2 4}$ represent conversion coefficients of the first sub-pixels of the $j_2$-th row in the first region of the first image, $\beta_{j_2 3}$ and $\beta_{j_2 4}$ represent conversion coefficients of the second sub-pixels of the $j_2$-th row in the first region of the first image $\gamma_{j_2 3}$ and $\gamma_{j_2 4}$ represent conversion coefficients of the third sub-pixels of the $j_2$-th row in the first region of the first image, and $\alpha_{j_2 3} + \alpha_{j_2 4} = 1$, $\beta_{j_2 3} + \beta_{j_2 4} = 1$, $\gamma_{j_2 3} + \gamma_{j_2 4} = 1$.

For example, in an example, when the second computer instruction is executed by the second processor 720, following steps may be implemented: generating an original image; determining a first region and a second region in the original image; performing high-definition rendering processing on the first region in the original image by using the image processing device, and performing compression rendering processing on the second region in the original image, so as to generate the first image that is compressed; outputting the first image that is compressed to the display device.

For example, the first region may be a fixation region, and the second region may be a non-fixation region. Therefore, the display system may further include an eye-control device (not shown). The eye-control device may detect the line of sight of human eyes through eye-tracking technology, so as to determine the first region in the original image.

For example, the eye-control device may track the line of sight of the human eyes according to feature changes in eyeballs and the periphery of the eyeballs. The eye-control device may also track the line of sight of the human eyes according to change of an iris angle. The eye-control device may also extract eyeball features by actively projecting light beams such as infrared rays or the like to the iris, thereby achieving tracking the line of sight of the human eyes.

For example, the eye-control device may include hardware equipment such as infrared equipment or image acquiring equipment. The image acquiring equipment may be a camera on an electronic device such as a mobile phone or a computer.

For example, in an example, when the second computer instruction is executed by the second processor 720, following steps may further be implemented: detecting a line of sight of human eyes by using an eye-control device; determining a first region in the original image according to the line of sight of the human eyes. For example, the region in the original image other than the first region is the second region.

For example, the second region of each image (the first image, the second image and the original image) includes a first sub-region, a second sub-region and a third sub-region. The first sub-region is adjacent to the first region in the first direction, the second sub-region is adjacent to the first region in the second direction, and the third sub-region is not adjacent to the first region.

For example, the first direction is perpendicular to the second direction.

For example, the second region in the original image includes a first sub-region, a second sub-region and a third sub-region. The first sub-region in the original image is adjacent to the first region in the original image in the first direction, the second sub-region in the original image is adjacent to the first region in the original image in the second direction, and the third sub-region in the original image is not adjacent to the first region in the original image. The second region in the first image also includes the first sub-region, the second sub-region and the third sub-region, which are in one-to-one correspondence to the first sub-region, the second sub-region and the third sub-region in the second region of the original image.

For example, the first sub-region may include at least one part, the second sub-region may include at least one part, and the third sub-region may also include at least one part. Therefore, the original image may be divided into a plurality of parts. Correspondingly, the first image and the second image may also be divided into a plurality of parts. The embodiments of the present disclosure do not specifically limit the number and arrangement mode of respective parts in the original image, the first image and the second image.

For example, in an example, when the second computer instruction is executed by the second processor 720, following steps may also be implemented: in a first direction, compressing the first sub-region in the original image according to a ratio of 1/F1; in a second direction, compressing the second sub-region in the original image according to a ratio of 1/F2; in the first direction, compressing the third sub-region in the original image according to the ratio of 1/F1, and in the second direction, compressing the third sub-region in the original image according to the ratio of 1/F2.

For example, in an example, when the first computer instruction is executed by the first processor 710, following steps may also be implemented: in a first direction, expanding the first sub-region in the first image according to a ratio of F½, and in a second direction, compressing the first sub-region in the first image according to a ratio of ½; in the second direction, expanding the second sub-region in the first image according to a ratio of F2/2, and in the first direction, compressing the second sub-region in the first image according to a ratio of ½; in the first direction, expanding the third sub-region in the first image according to the ratio of F½, and in the second direction, expanding the third sub-region in the first image according to the ratio of F2/2.

For example, the expansion processing and the compression processing both may use an interpolation algorithm.

For example, in an example, when the first computer instruction is executed by the first processor 710, following steps may be implemented: performing pixel conversion on pixels of the second region in the first image by using a third conversion formula.

For example, the third conversion formula may be expressed as:

$$X''_{(2k-1)l} = X''_{(2k)l} = x''_{kl},$$

$$Y''_{(2k-1)l} = Y''_{(2k)l} = y''_{kl},$$

$$Z''_{(2k-1)l} = Z''_{(2k)(l+1)} = z''_{kl},$$

where k, l, $m_2$ and $n_3$ all are integers, $n_3$ represents the total number of columns of pixels in the k-th row, $m_2$ represents the total number of rows of pixels in the first sub-region, the second sub-region and the third sub-region, and k=1, 2, 3, . . . , $m_2$ is used to represent the number of rows, l=1, 2, 3, . . . , $n_3$ is used to represent the number of columns, $X''_{(2k-1)l}$, $Y''_{(2k-1)l}$ and $Z''_{(2k-1)l}$ respectively represent the data signals of the first sub-pixel, the second sub-pixel and the third sub-pixel of the (2k−1)-th row and the l-th column in each sub-region of the second region in the second image. $X''_{(2k)l}$ and $Y''_{(2k)l}$ respectively represent the data signals of the first sub-pixel and the second sub-pixel of the (2k)-th row and the l-th column in each sub-region of the second region in the second image. $Z''_{(2k)(l+1)}$ represents the data signal of the third sub-pixel of the (2k)-th row and the (l+1)-th column in each sub-region of the second region in the second image. $x''_{kl}$, $y''_{kl}$ and $z''_{kl}$ respectively represent data signals of the first sub-pixel, the second sub-pixel and the third sub-pixel of the k-th row and the l-th column in each sub-region of the second region in the first image.

It should be noted that, for the detailed descriptions of the expansion processing, $m_2$, the compression processing, the first conversion formula, the second conversion formula, the third conversion formula, the conversion coefficients of each sub-pixel, and the like, reference may be made to the related descriptions in the embodiments of the image display method, and the repetitions are not described herein again.

At least one embodiment of the present disclosure further provides a computer-readable storage medium, which stores computer instructions adapted to be executed by a processor. When the computer instructions are executed by the processor, following steps may be implemented: acquiring a compressed first image; determining a first region and a second region in the first image; performing a first rendering algorithm on the first region in the first image and performing a second rendering algorithm on the second region in the first image, so as to obtain a second image, where the rendering resolution of the first rendering algorithm is greater than the rendering resolution of the second rendering algorithm; and displaying the second image.

For example, when the computer instructions are executed by the processor, one or more steps in the above-mentioned image display method may also be performed.

For example, in an example of the embodiments of the present disclosure, the computer-readable storage medium may be applied to the display system according to any one of the above-mentioned embodiments. For example, the computer-readable storage medium may be the first memory in the display device of the display system.

For example, for a description of the computer-readable storage medium, reference may be made to the description of the first memory in the embodiment of the display system, and similar descriptions will be omitted herein.

Figure 8:
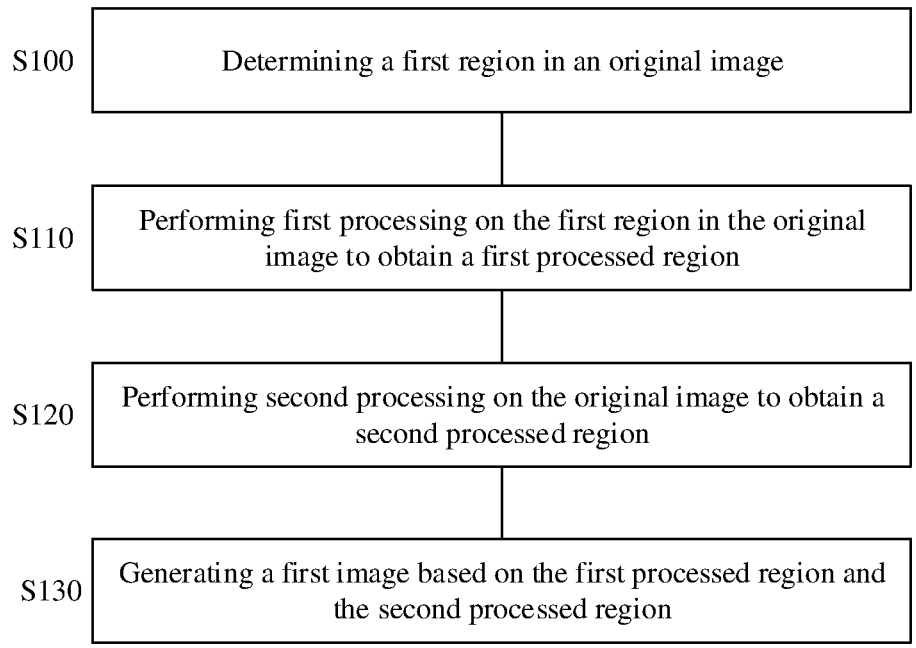
FIG. 8 is a schematic diagram of an image processing method provided by at least one embodiment of the present disclosure.

At least one embodiment of the present disclosure also provides an image processing method. FIG. 8 is a schematic diagram of an image processing method provided by at least one embodiment of the present disclosure.

For example, the image processing method provided by the embodiment of the present disclosure can be applied to an image processing device. As shown in FIG. 8, the image processing method provided by the embodiment of the present disclosure comprises the following steps S100~S130.

S100: determining a first region in an original image.

S110: performing first processing on the first region in the original image to obtain a first processed region.

S120: performing second processing on the original image to obtain a second processed region.

S130: generating a first image based on the first processed region and the second processed region.

For example, a resolution corresponding to the first processing is greater than a resolution corresponding to the second processing, so that a resolution of the first processed region is greater than a resolution of the second processed region.

It should be noted that, in the present disclosure, "resolution corresponding to a processing" can mean a resolution of an image or a region that is obtained by using the processing, for example, the resolution corresponding to the first processing mean a resolution of a region (namely, the first processed region) that is obtained by using the first processing. The "resolution of a region" can indicate correspondence between pixel data corresponding to each pixel in the region and the pixels (pixels in the physical sense) on a display panel that is used to display the region, the smaller the number of pixels, used for displaying the pixel data of one pixel in the region, on the display panel, the greater the resolution of the region. For example, the pixel data corresponding to each pixel in the first processed region can be displayed by s1 pixels, and the pixel data corresponding to each pixel in the second processed region can be displayed by s2 pixels, s1 is less than s2, for example, s1 can be 1, s2 can be 2, 3, and so on.

For example, a size of the first image is smaller than a size of the original image, and the amount of data corresponding to the first image is smaller than the amount of data corresponding to the original image.

In the image processing method provided by the present disclosure, the image processing device performs different processing on the first region in the original image and the original image respectively, so that while ensuring the display effect of the first region, the data transmission amount from the image processing device to the display device can be reduced, the data transmission bandwidth can be saved, the power consumption can be saved, the refresh rate can be increased, and the user immersion and the user experience can be improved.

For example, in some embodiments, the image processing device may include a graphics card (for example, GPU). For example, in some embodiments, the image processing device may be applied to virtual reality or augmented reality equipment, and the virtual reality or augmented reality equipment may be head-mounted equipment, for example, VR glasses or AR glasses.

For example, the first processing and the second processing are different. For example, in some examples, the first processing is high-definition processing, and the second processing is compression processing, so that the image processing method can achieve high-definition processing of the first region, and low-definition processing and compression of the original image, thus while not affecting the visual viewing effect, reducing the amount of unnecessary data, thereby solving the problem of large storage data and large transmission bandwidth corresponding to virtual or augmented reality technology.

For example, the first processing may comprise up-scaling processing or not processing the first region, and the second processing may comprise down-scaling processing or not processing the original image. It should be noted that the first processing and/or the second processing may also comprise other processing, such as contrast enhancement processing. When the first processing is the up-scaling processing, the second processing may comprise down-scaling processing or not processing; when the first processing represents not processing the first region, the second processing may comprise down-scaling processing.

In the present disclosure, "scaling processing" represents increasing or decreasing the resolution of a region. For example, "up-scaling processing" represents increasing the resolution of the region, "down-scaling processing" represents decreasing the resolution of the region.

For example, a shape of the first region may be a regular or irregular shape such as a rectangle, a diamond, a circle, an ellipse, a cross shape, or a triangle, and the embodiment of the present disclosure does not specifically limit the shape of the first region. Considering from the perspective of compression coding, the shape of the first region may be a rectangle to facilitate compression coding. In this case, the coding efficiency is high and the coding complexity is low. In the description of the present disclosure, unless otherwise specified, the description is made by taking the shape of the first region as a rectangle as an example.

For example, the shape of the original image can be a rectangle, a length and a width of the first region can be adaptively set according to the parameters of the original image such as brightness, contrast, gray distribution, color distribution, and the number of pixels, the length and the width of the first region are smaller than any one of the length and the width of the original image, and the sides of the first region are respectively parallel to the corresponding sides of the original image, that is, if the length side of the first region is parallel to the length side of the original image, the width side of the first region is parallel to the width side of the original image; if the length side of the first region is parallel to the width side of the original image, the width side of the first region is parallel to the length side of the original image.

It should be noted that the shape of the original image can also be any shape such as a circle, which is determined according to actual conditions, and the present disclosure does not limit this.

For example, in some embodiments, the step S100 may include: determining a target pixel in the original image; and determining the first region based on the target pixel and a distance threshold. For example, a distance between each pixel in the first region and the target pixel is less than or equal to the distance threshold.

For example, the distance threshold can be set according to actual conditions, and the embodiment of the present disclosure does not limit the specific value of the distance threshold.

For example, in other embodiments, the step S100 may include: determining a target pixel in the original image; and determining that a region located in a predetermined shape with a predetermined size centered on the target pixel is the first region.

For example, in some examples, the target pixel may be the center of symmetry of the first region. However, the present disclosure does not limit this. The target pixel can be any one pixel in the first region, and the position of the target pixel in the first region can be determined according to actual conditions.

For example, in other embodiments, the step S100 may include: determining that a region with the target pixel as a center and the number of pixels meeting the preset number condition is the first region.

For example, the target pixel on the original image is determined by real-time detection or may be a fixed point on the original image.

For example, in some examples, the first region is a fixed region in the original image, and is fixed in the subsequent process, in this case, the target pixel is a preset pixel, and the preset pixel may be a preset and fixed pixel, for example, the central pixel of the original image. For example, the first region may be a foveal region corresponding to the human eye in the original image, the foveal region is a fixed region in the original image, and the foveal region represents the region with the greatest visual acuity in the original image. For VR glasses, a specific region in the original image can be set to be the region that the human eye looks at, that is, the foveal region, and the specific region is the first region.

For example, the gaze tracking technology or the fovea technology can be used to determine the first region on the original image. In this case, the first region changes with the gaze point (fixation point) of the human eye. For example, the target pixel is the gaze point of the human eye on the original image, the first region is the gaze region in the original image, and the first region can change with the direction of the line of sight of the human eye. For example, the gaze point may represent the position in the original image that the human eyes are currently directly gazing at. For example, the gaze region refers to the region in the original image that is closer to the gaze point, that is, the region that the user is currently focusing on; the region other than the first region in the original image represents a region in the original image that is away from the gaze point, that is, a region that the user may see but does not pay attention to. Therefore, the image processing method can achieve the gaze point rendering effect.

For example, in some examples, determining the gaze point of the human eye on the original image may include: acquiring an image including the human eye, and detecting the state of the human eye (that is, the line of sight of the human eye) based on the image to determine the gaze point of the human eye.

For example, the image including the human eye is acquired through an image acquisition module provided in the image processing device, or the image processing device receives the image including the human eye transmitted from other terminals.

In some embodiments, the image including the human eye is the eye image or eyeball image corresponding to the human eye; the eye state is detected based on the image including the human eye, that is, the pupil image is extracted from the eye image or the eyeball image, the coordinate system is established based on the position of the pupil in the pupil image, the coordinates of the center of the pupil is mapped to the original image, or the coordinate conversion is performed according to the coordinate system established in the original image, and thus the position of the point corresponding to the mapping point or the result of the coordinate conversion is used as the gaze point. Alternatively, the image including the human eye may also include eye movement information, and the gaze point is determined based on the eye movement information.

For example, in some examples, the predetermined shape may be a rectangle, and the predetermined size may include the length and the width of the rectangle; in other examples, the predetermined shape may be a circle, and in this case, the predetermined size may include the radius of the circle.

Figure 9A:
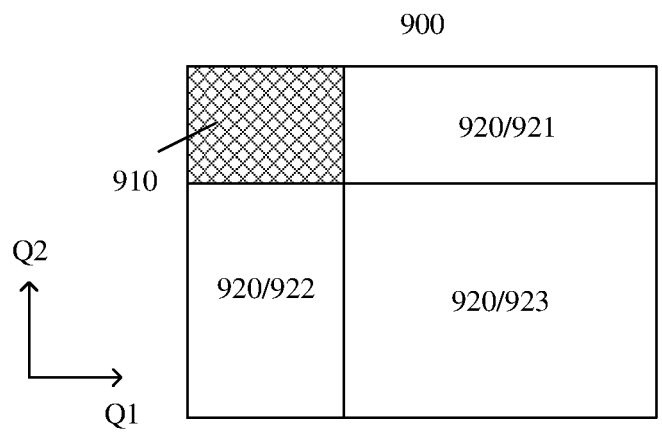
FIG. 9A is a schematic diagram of an original image provided by some embodiments of the present disclosure.
Figure 9B:
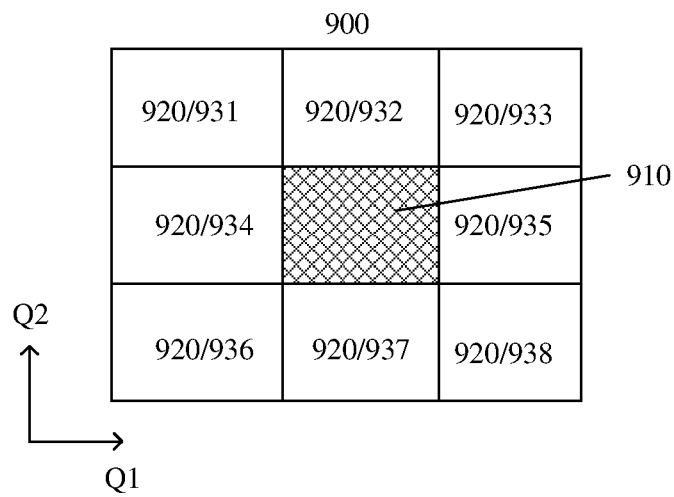
FIG. 9B is a schematic diagram of another original image provided by some embodiments of the present disclosure.
Figure 9C:
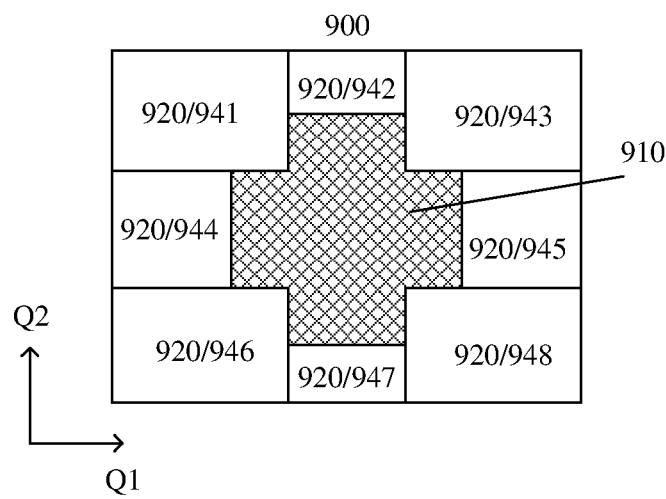
FIG. 9C is a schematic diagram of yet another original image provided by some embodiments of the present disclosure.
Figure 9D:
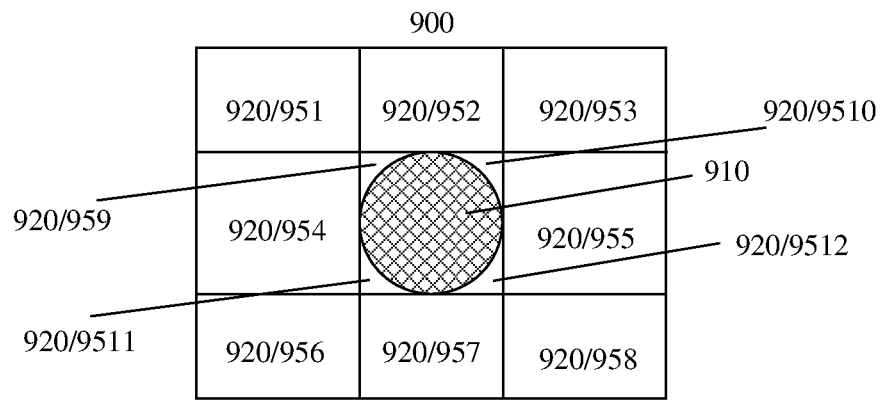
FIG. 9D is a schematic diagram of still another original image provided by some embodiments of the present disclosure.

FIG. 9A is a schematic diagram of an original image provided by some embodiments of the present disclosure, FIG. 9B is a schematic diagram of another original image provided by some embodiments of the present disclosure, FIG. 9C is a schematic diagram of yet another original image provided by some embodiments of the present disclosure, and FIG. 9D is a schematic diagram of still another original image provided by some embodiments of the present disclosure.

For example, as shown in FIGS. 9A and 9B, the original image 900 may include a first region 910, the shape of the original image 900 is a rectangle, and the shape of the first region 910 may be a rectangle. As shown in FIG. 9A, in some examples, two adjacent sides of the first region 910 overlap with two adjacent sides of the original image 900, respectively; in other examples, a side of the first region 910 overlaps with a side of the original image 900; or, in still other examples, as shown in FIG. 9B, all sides of the first region 910 do not overlap with the sides of the original image 900, in this case, the first region 910 is located in the middle of the original image 900, that is, the first region 910 is not in contact with sides and corners of the original image 900. The embodiment of the present disclosure does not limit the specific position of the first region 910.

For example, as shown in FIG. 9C, the shape of the first region 910 may be a cross shape. As shown in FIG. 9D, the shape of the first region 910 may be a circle.

For example, in some embodiments, the image processing method further comprises: determining a plurality of boundary pixels in the original image based on a position of the first region in the original image; performing mapping processing on coordinate values of the plurality of boundary pixels to obtain a plurality of labeled pixel data.

For example, the step S110 includes: performing the first processing on the first region to obtain a plurality of first image pixel data corresponding to all pixels in the first region; and obtaining the first processed region based on the plurality of labeled pixel data and the plurality of first image pixel data. The first region is a region defined by the plurality of boundary pixels in the original image.

For example, the shape of the first processed region may be a rectangle.

For example, if the first region is determined based on the target pixel and the distance threshold, the position of the first region in the original image can be determined based on the target pixel and the distance threshold, thereby determining the plurality of boundary pixels, that is, the plurality of boundary pixels can be determined based on the target pixel and the distance threshold.

For example, if the first region is determined based on the target pixel, the predetermined size, and the predetermined shape, the position of the first region in the original image can be determined based on the target pixel, the predetermined size, and the predetermined shape, thereby determining the plurality of boundary pixels, that is, the plurality of boundary pixels can be determined based on the target pixel, the predetermined size, and the predetermined shape.

For example, as shown in FIGS. 9A and 9B, the plurality of boundary pixels may be pixels on the four sides of the first region 910. In other examples, when the shape of the first region is a circle, the plurality of boundary pixels may be pixels on the circumference of the first region.

For example, the number of the plurality of boundary pixels may be determined according to the size and the shape of the first region, and the position of the first region in the original image may be determined based on the plurality of boundary pixels.

For example, in some embodiments, in the step S110, performing the mapping processing on the coordinate values of the plurality of boundary pixels to obtain the plurality of labeled pixel data means converting the coordinate value of each boundary pixel into data that can be represented by the pixel data of the pixel. For example, the pixel data (labeled pixel data/image pixel data) may be the pixel value of the pixel, for example, the grayscale value.

For example, taking a case that the original image is an image with 4k resolution as an example, the coordinate value of the pixel in the original image ranges between (0, 0) and (4320, 4800), and the grayscale value of the pixel generally falls into (0, 255). Obviously, the pixel data cannot be used to directly represent the coordinate value of the pixel, the coordinate value of the pixel needs to be converted to the value interval (for example, (0, 255)) corresponding to the grayscale value. For example, the coordinate value of the boundary pixel can be converted to the value interval corresponding to the grayscale value of the pixel based on a first transformation parameter. The first transformation parameter can be arbitrarily selected according to the actual situation, as long as it can meet the requirements of the mapping processing.

For example, the pixel value of one or more pixels can be used to represent the coordinate value of one boundary pixel. For example, the pixel values of several adjacent pixels may be used to represent the coordinate value of one boundary pixel. For example, in some examples, the pixel values of two adjacent pixels may be used to represent the coordinate value of one boundary pixel, for example, a pixel value of a first pixel of the two adjacent pixels represents a high pixel value after the mapping process, a pixel value of a second pixel of the two adjacent pixels represents a low pixel value after the mapping process, herein, the high pixel value may represent a quotient obtained by dividing the coordinate value of the boundary pixel by the first transformation parameter, and the low pixel value may represent a remainder obtained by dividing the coordinate value of the boundary pixel by the first transformation parameter. In this case, the condition that the first transformation parameter needs to meet is: the value of the quotient and remainder obtained by dividing the coordinate value by the first transformation parameter falls within the value interval corresponding to the grayscale value. For example, when it needs to map the coordinate value in the coordinate range from (0, 0) to (4320, 4800) to the range of (0, 255), the first transformation parameter can be any integer between (4800/255, 255). For example, the first transformation parameter may be 250.

For example, when the coordinate value of the boundary pixel is in two-dimensional form, that is, when the coordinate value of the boundary pixel comprises a value corresponding to a first axis (X axis) and a value corresponding to a second axis (Y axis), the value corresponding to each axis can be mapped to pixel data using the above-mentioned method. When the coordinate value of the boundary pixel have values corresponding to more axes (X axis, Y axis, Z axis, etc.), the values corresponding to respective axes can be mapped in the same way. However, the present disclosure is not limited to this, and the values corresponding to different axes can also be mapped in different ways.

For example, in some other embodiments, the image processing method further comprises: determining at least one labeled pixel in the original image based on a position of the first region in the original image; performing mapping processing on a coordinate value of the at least one labeled pixel and size information of the first region to obtain a plurality of labeled pixel data. For example, the step S110 includes: performing the first processing on the first region to obtain a plurality of first image pixel data corresponding to all pixels in the first region; obtaining the first processed region based on the plurality of labeled pixel data and the plurality of first image pixel data.

For example, in a case where the shape of the first region is a regular shape, the position of the first region in the original image may be determined based on the size information of the first region and at least one label pixel. For example, the size information of the first region may include the size of the first region, and the number of the at least one labeled pixel may be determined according to the shape of the first region. For example, in a case where the shape of the first region is a rectangle, the at least one labeled pixel may be one pixel corresponding to the center of the first region, and the size information of the first region may include the length and the width; for another example, in a case where the shape of the first region is a circle, the at least one labeled pixel may be one pixel corresponding to the center of the first region, and the size information of the first region may include a radius.

For example, in other embodiments, in a case where the size of the first region is fixed, the size information of the first region can be stored in the display device, so that the size information of the first region does not need to be transmitted to the display device. In this case, the image processing method further comprises: determining at least one labeled pixel in the original image based on a position of the first region in the original image; performing mapping processing on a coordinate value of the at least one labeled pixel to obtain at least one labeled pixel data. For example, the step S110 includes: performing the first processing on the first region to obtain a plurality of first image pixel data corresponding to all pixels in the first region; obtaining the first processed region based on the at least one labeled pixel data and the plurality of first image pixel data. In this example, the first processed region does not include the size information of the first region.

For example, in some embodiments, in the step S110, performing the mapping processing on the coordinate value of the at least one labeled pixel and the size information of the first region to obtain the plurality of labeled pixel data means converting the coordinate value of each labeled pixel into data that can be represented by the pixel data of the pixel, and converting the size information of the first region into data that can be represented by the pixel data of the pixel.

For example, the coordinate value of the labeled pixel may be converted to the value interval corresponding to the grayscale value of the pixel based on the first transformation parameter, and the size information of the first region may be converted to the value interval corresponding to the grayscale value of the pixel based on a second transformation parameter. The first transformation parameter and the second transformation parameter can be arbitrarily selected according to the actual situation, as long as the specific mapping requirements can be met.

For example, the pixel value of one or more pixels (for example, two pixels) can be used to represent the coordinate value of one labeled pixel. Similarly, the pixel value of one or more pixels (for example, two pixels) can be used to represent the size information of the first region.

For example, the first processed region may include pixels arranged in a plurality of rows and a plurality of columns. In step S110, the pixel values of at least some pixels in a1 pixel row(s) of the first processed region may be set as the plurality of labeled pixel data. a1 is a positive integer, and the value of a1 can be determined according to the number of the labeled pixel data. For example, when a1 is greater than 1, the a1 pixel rows may be continuous, that is, there is no pixel row between the a1 pixel rows, or the a1 pixel rows may be discontinuous, that is, there is at least one pixel row between two rows of the a1 pixel rows.

Figure 10A:
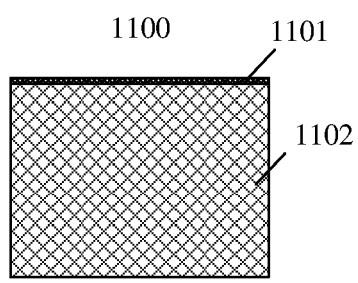
FIG. 10A is a schematic diagram of a first processed region provided by some embodiments of the present disclosure.

FIG. 10A is a schematic diagram of a first processed region provided by some embodiments of the present disclosure.

For example, in some embodiments, the first processed region has a1 pixel rows more than the first region. For example, the first region includes a plurality of pixels arranged in m rows and n columns, and the first processed region may include a plurality of pixels arranged in (m+a1) rows and n columns. The extra a1 pixel rows are used to store the plurality of labeled pixel data. For example, as shown in FIG. 10A, the pixel values of the pixels in a sub-region 1101 of the first processed region 1100 may be the plurality of labeled pixel data, the pixel values of the pixels in a sub-region 1102 of the first processed region 1100 may be the plurality of first image pixel data. In some examples, a1 is 1, in this case, the sub-region 1101 may include one pixel row and is a first pixel row of the first processed region, and the sub-region 1102 may include m pixel rows, that is, from a second pixel row to a (m+1)-th pixel row; or the sub-region 1101 may include one pixel row and is a last pixel row (that is, (m+1)-th pixel row) of the first processed region, and the sub-region 1102 may include m pixel rows, that is, from a first pixel row to a m-th pixel row.

It should be noted that, in order to clearly show the sub-region 1101, the sub-region 1101 is represented by a black rectangle in FIG. 10A, which does not represent the actual size of the sub-region 1101.

For example, obtaining the first processed region based on the plurality of labeled pixel data and the plurality of first image pixel data includes: creating a new region (the newly created region comprises a plurality of pixels arranged in (m+a1) rows and n columns), setting the pixel values of at least some pixels of a1 pixel rows in the newly created region to the plurality of labeled pixel data and setting the pixel values of the pixels of the m pixel rows other than the a1 pixel rows in the newly created region as the plurality of first image pixel data, so as to obtain the first processed region.

It should be noted that if the number of pixels included in the a1 pixel rows of the first processed region is greater than the number of the plurality of labeled pixel data, after setting the pixel values of some pixels of the a1 pixel rows as the plurality of labeled pixel data, the pixel values of the remaining pixels in the a1 pixel rows can be set to 0.

Those skilled in the art can understand that the method of obtaining the first processed region based on the plurality of labeled pixel data and the plurality of first image pixel data is not limited to the above example. According to actual conditions, any suitable method may be used to obtain the first processed region based on the plurality of labeled pixel data and the plurality of first image pixel data.

For example, in the first processed region, specific data for identifying the labeled pixel data and the first image pixel data can be inserted before or after the plurality of labeled pixel data, and/or between the plurality of labeled pixel data and the plurality of first image pixel data, thereby making it possible to identify and distinguish the labeled pixel data and the first image pixel data in the subsequent processing.

For example, in some embodiments, the labeled pixel data may not be set in the first processed region, but may be set in the second processed region. For example, in some examples, the image processing method further comprises: determining a plurality of boundary pixels in the original image based on a position of the first region in the original image; performing mapping processing on coordinate values of the plurality of boundary pixels to obtain a plurality of labeled pixel data, in this case, the first region is a region defined by the plurality of boundary pixels in the original image. For example, in some other examples, the image processing method further comprises: determining at least one labeled pixel in the original image based on a position of the first region in the original image; performing mapping processing on a coordinate value of the at least one labeled pixel and size information of the first region to obtain a plurality of labeled pixel data.

For example, the step S120 comprises: performing the second processing on the original image to obtain a plurality of second image pixel data corresponding to at least some pixels of the original image; obtaining the second processed region based on the plurality of labeled pixel data and the plurality of second image pixel data.

It should be noted that, for "boundary pixel", "labeled pixel", "mapping processing", and the like, reference may be made to the above related descriptions, and the repetitions will not be repeated.

For example, in some embodiments, a processing parameter corresponding to the second processing may also be integrated into the second processed region, so that a corresponding operation can be performed on the second processed region based on the processing parameter corresponding to the second processing in the subsequent processing process. For example, if the second processing is compression processing, the processing parameter corresponding to the second processing may include a compression ratio corresponding to the compression processing on each sub-region in the second region, for example, for the example shown in FIG. 9A, the processing parameter corresponding to the second processing may include a first parameter and a second parameter (described in detail below). It should be noted that the processing parameter corresponding to the second processing can be determined according to the actual situation, which is not limited in the present disclosure.

In some examples, the image processing method further comprises: determining a plurality of boundary pixels in the original image based on a position of the first region in the original image; performing mapping processing on coordinate values of the plurality of boundary pixels to obtain a plurality of labeled pixel data; performing mapping processing on a processing parameter corresponding to the second processing to obtain at least one parameter pixel data. The first region is a region defined by the plurality of boundary pixels in the original image. In some other examples, the image processing method further comprises: determining at least one labeled pixel in the original image based on a position of the first region in the original image; performing mapping processing on a coordinate value of the at least one labeled pixel and size information of the first region to obtain a plurality of labeled pixel data; performing mapping processing on a processing parameter corresponding to the second processing to obtain at least one parameter pixel data.

For example, the step S120 includes: performing the second processing on the original image to obtain a plurality of second image pixel data corresponding to at least some pixels of the original image; obtaining the second processed region based on the plurality of labeled pixel data, the at least one parameter pixel data, and the plurality of second image pixel data.

For example, the mapping process for the processing parameter corresponding to the second processing is similar to the above-mentioned mapping process for the coordinate value, and the repetition is not repeated here.

For example, the second processed region may include a plurality of pixels arranged in a plurality of rows and a plurality of columns. In the second processed region, at least one pixel value of at least one pixel in a2 pixel row(s) of the second processed region may be set as the at least one parameter pixel data, the pixel values of at least some pixels in a3 pixel row(s) of the second processed region can be set as the plurality of labeled pixel data. a2 and a3 are positive integers, the value of a2 can be determined according to the number of the parameter pixel data, and the value of a3 can be determined according to the number of the labeled pixel data. For example, the a2 pixel rows may be continuous or discontinuous, and similarly, the a3 pixel rows may be continuous or discontinuous. The a2 pixel rows and the a3 pixel rows may or may not be adjacent to each other, and can be set according to specific conditions. For example, in some examples, both a2 and a3 are 1, in this case, the at least one pixel value of the at least one pixel in the first pixel row in the second processed region can be set as the parameter pixel data, and the pixel values of at least some pixels in the second pixel row in the second processed region can be set as the labeled pixel data. The pixel values of the pixels in the remaining pixel rows in the second processed region are set as the plurality of second image pixel data.

For another example, in a case where the number of pixels in one pixel row in the second processed region is greater than the sum of the number of the parameter pixel data and the number of the labeled pixel data, the pixel values of at least some pixels in the same pixel row in the second processed region may be set as the parameter pixel data and the labeled pixel data.

Figure 10B:
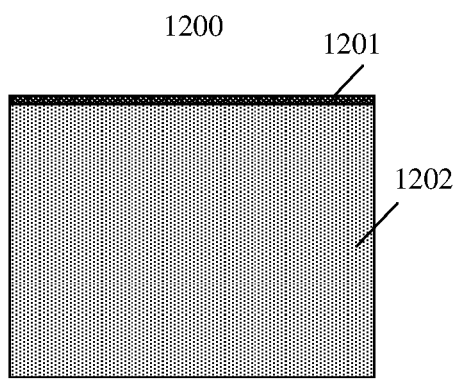
FIG. 10B is a schematic diagram of a second processed region provided by some embodiments of the present disclosure.

FIG. 10B is a schematic diagram of a second processed region provided by some embodiments of the present disclosure.

For example, in some embodiments, the second processed region includes a plurality of pixels arranged in a plurality of rows and a plurality of columns. For example, as shown in FIG. 10B, the pixel values of the pixels in a sub-region 1201 of the second processed region 1200 may be the labeled pixel data and/or the parameter pixel data, the pixel values of the pixels in a sub-region 1202 of the second processed region 1200 may be the plurality of second image pixel data. In some examples, the sub-region 1201 may include one pixel row and is a first pixel row or a last pixel row of the second processed region, for example, the pixel values of the pixels in the one pixel row represents the labeled pixel data and/or the parameter pixel data. The sub-region 1202 may include a plurality of pixel rows. When the pixel values of the pixels in the sub-region 1201 of the second processed region 1200 represent the labeled pixel data and the parameter pixel data, the sub-region 1201 may include two pixel rows, and the pixel values of the pixels in one pixel row of the two pixel rows represents the labeled pixel data, and the pixel values of the pixels in the other pixel row of the two pixel rows represents the parameter pixel data. It should be noted that if the number of pixels included in the one pixel row of the second processed region 1200 is greater than the number of the labeled pixel data, after setting the pixel values of some pixels of a pixel row as the labeled pixel data, the pixel values of the remaining pixels in the pixel row can be set to 0. Similarly, if the number of pixels included in the one pixel row of the second processed region 1200 is greater than the number of the parameter pixel data, after setting the pixel values of some pixels of a pixel row as the parameter pixel data, the pixel values of the remaining pixels in the pixel row can be set to 0.

It should be noted that, in order to clearly show the sub-region 1201, the sub-region 1201 is represented by a black rectangle in FIG. 10B, which does not represent the actual size of the sub-region 1201.

For example, in the second processed region, specific data for identifying the parameter pixel data and the labeled pixel data can be inserted between the parameter pixel data and the labeled pixel data, so that the parameter pixel data and the labeled pixel data can be identified and distinguished in the subsequent processing. Similarly, specific data for identifying the second image pixel data and the labeled pixel data can be inserted between the second image pixel data and the labeled pixel data, so that the second image pixel data and the labeled pixel data can be identified and distinguished in the subsequent processing; specific data for identifying the second image pixel data and the parameter pixel data can be inserted between the second image pixel data and the parameter pixel data, so that the second image pixel data and the parameter pixel data can be identified and distinguished in the subsequent processing.

It should be noted that in other embodiments, the processing parameter corresponding to the second processing may also be integrated into the first processed region, that is, the at least one parameter pixel data is set in the first processed region.

For example, in other examples, when the plurality of labeled pixel data, the at least one parameter pixel data are obtained, the step S110 includes: performing the first processing on the first region to obtain a plurality of first image pixel data corresponding to all pixels in the first region; obtaining the first processed region based on the plurality of labeled pixel data, the at least one parameter pixel data, and the plurality of first image pixel data.

It should be noted that the labeled pixel data and/or the parameter pixel data can be integrated in the first processed region or the second processed region, or the labeled pixel data and/or the parameter pixel data can be independent with the first processed region and the second processed region. For example, in some embodiments, the step S130 comprises: generating the first image based on the plurality of labeled pixel data, the first processed region and the second processed region; or generating the first image based on the plurality of labeled pixel data, the at least one parameter pixel data, the first processed region and the second processed region. In this case, the first processed region only comprises the plurality of first image pixel data, the second processed region only comprises the plurality of second image pixel data. In this case, because the labeled pixel data and/or the parameter pixel data are independent with the first processed region and the second processed region, the display device can simply distinguish the labeled pixel data and/or the parameter pixel data from the image pixel data (the first image pixel data and the second image pixel data), so as to simplify the process of obtaining the labeled pixel data and/or the parameter pixel data in the first image and facilitate the subsequent processing of the display device. For example, at least one pixel value of at least one pixel in the first image may be set as the at least one parameter pixel data, a plurality of pixel values of a plurality of pixels (the plurality of pixels may be arranged in one row or one column, or may also be arranged in several rows and/or several columns) in the first image may be set as the labeled pixel data. The pixel values of pixels in a row except for the pixel, the pixel value of which is used to indicate the parameter pixel data/labeled pixel data, can be set to 0.

Figure 10C:
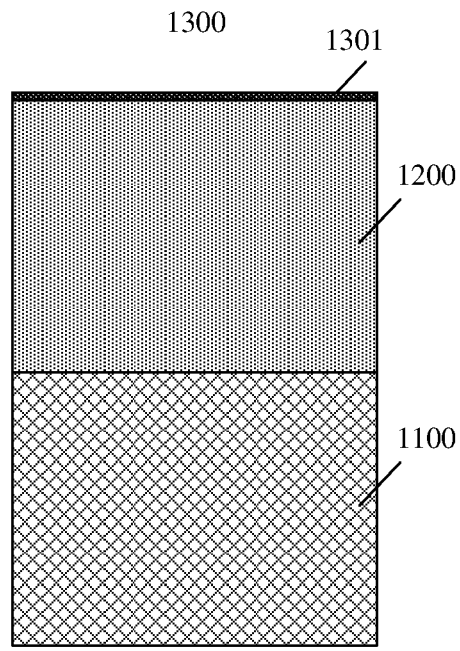
FIG. 10C is a schematic diagram of a first image provided by some embodiments of the present disclosure.

FIG. 10C is a schematic diagram of a first image provided by some embodiments of the present disclosure.

For example, in some embodiments, as shown in FIG. 10C, the first image 1300 comprises the first processed region 1100, the second processed region 1200, and a sub-region 1301. The pixel values of the pixels in the sub-region 1301 of the first image 1300 are the labeled pixel data and/or the parameter pixel data, the pixel values of the pixels in the first processed region 1100 are the plurality of first image pixel data, and the pixel values of the pixels in the second processed region 1200 are the plurality of second image pixel data.

It should be noted that the coordinate value of the pixel represents the coordinate value of the pixel in a coordinate system determined based on the original image.

For example, the second processed region may comprises a non-display sub-region, the non-display sub-region does not need to region or the non-display sub-region display as black, and the labeled pixel data and/or the parameter pixel data may be integrated into the non-display sub-region, for example, at least one pixel value of at least one pixel in the non-display sub-region may be set as the at least one parameter pixel data, a plurality of pixel values of a plurality of pixels (the plurality of pixels may be arranged in one row or one column, or may also be arranged in several rows and/or several columns) in the non-display sub-region may be set as the labeled pixel data. The non-display sub-region may be at a corner of the second processed region. In this case, at least one row or at least one column in the second processed region comprises both the parameter pixel data/labeled pixel data and the second image pixel data.

It should be noted that the parameter pixel data and/or the labeled pixel data may be integrated into any one or two of the first processed region, the second processed region, or a region other than the first processed region and the second processed region in the first image. For example, in some examples, the first processed region comprises the labeled pixel data, while the second processed region comprises the parameter pixel data; or the first processed region comprises the parameter pixel data, while the second processed region comprises the labeled pixel data, and the present disclosure is not limited thereto.

For example, in some embodiments, the step S120 may include: determining a region other than the first region in the original image to obtain a second region; and performing the second processing on the second region to obtain the second processed region. For example, in this embodiment, performing the second processing on the original image means performing the second processing on the second region, and the at least some pixels of the original image may be pixels in the second region. It should be noted that when the second processing is compression processing, the number of the plurality of second image pixel data is less than the number of pixels in the second region, for example, after the second processing, several pixels (two pixels, three pixels, and the like) in the second region correspond to one piece of second image pixel data.

For example, in some embodiments, the second region in the original image comprises a plurality of sub-regions, and different second processing can be performed on the plurality of sub-regions, and the different second processing correspond to different resolutions. For example, a resolution corresponding to a sub-region can be determined according to a distance between the sub-region and the first region. For example, the longer the distance between the sub-region and the first region, the lower the corresponding resolution.

For example, as shown in FIG. 9A, in some embodiments, the second region 920 in the original image 900 comprises a first sub-region 921, a second sub-region 922, and a third sub-region 923.

For example, as shown in FIG. 9A, the first sub-region 921 in the original image 900 is adjacent to the first region 910 in the original image 900 in a first direction Q1, the second sub-region 922 in the original image 900 is adjacent to the first region 910 in the original image 900 in a second direction Q2, and the third sub-region 923 in the original image 900 is not adjacent to the first region 910 in the original image 900, for example, the first direction Q1 is perpendicular to the second direction Q2.

It should be noted that in the present disclosure, "adjacent" may mean that the sub-region of the second region 920 (for example, the first sub-region 921 and the second sub-region 922 in FIG. 9A) is adjacent to at least one side of the first region 910. "Not adjacent" means that the sub-region in the second region 920 (for example, the third sub-region 923 in FIG. 9A) is not adjacent to any one side of the first region 910.

For example, the down-scaling processing may include compression processing. In the description of the present disclosure, unless otherwise specified, taking a case that the down-scaling processing is the compression processing as an example, but the present disclosure is not limited to this, and the second processing may also include other processing according to actual conditions.

For example, in the step S120, performing the second processing on the second region comprises: performing down-scaling processing on the second region. The image processing method further comprises: outputting the first image to a display device.

For example, in the step S120, in some examples, performing the second processing on the second region comprises: in the first direction, performing compression processing on the first sub-region in the original image according to a first parameter; in the second direction, performing compression processing on the second sub-region in the original image according to a second parameter; and in the first direction, performing compression processing on the third sub-region in the original image according to the first parameter, and in the second direction, performing compression processing on the third sub-region in the original image according to the second parameter.

For example, the first parameter and the second parameter can be set according to actual needs. The first parameter and the second parameter may be the same or different, and the present disclosure does not limit the specific values of the first parameter and the second parameter. For another example, the first parameter and the second parameter may be preset and remain unchanged during the image processing; or, the first parameter and the second parameter may also be changed according to the size of the second region in the original image.

For example, a first processed sub-region can be obtained after performing compression processing on the first sub-region in the original image according to the first parameter in the first direction; a second processed sub-region can be obtained after performing compression processing on the second sub-region in the original image according to the second parameter in the second direction; and a third processed sub-region can be obtained after performing compression processing on the third sub-region in the original image according to the first parameter in the first direction and performing compression processing on the third sub-region in the original image according to the second parameter in the second direction. The second processed region comprises the first processed sub-region, the second processed sub-region, and the third processed sub-region. For example, the first processed sub-region, the second processed sub-region, and the third processed sub-region may be spliced and synthesized according to the position relationship of the first processed sub-region, the second processed sub-region, and the third processed sub-region to obtain the second processed region.

For example, in the case where the data transmission amounts are the same and the original images have the fixed size, with respect to a first original image and a second original image, a size of the first original image is the same as that of the second original image (for example, 720*1080 (pixel)), but a gazing region of the first original image is different from that of the second original image. That is, a size of a first region in the first original image is different from a size of a first region in the second original image. For example, if the size of the first region in the first original image is less than the size of the first region in the second original image, i.e., a size of a second region in the first original image is larger than a size of a second region in the second original image, the first parameter and the second parameter for compressing the second region in the first original image may be larger than the first parameter and the second parameter for compressing the second region in the second original image, respectively, so that the data transmission amount of the first original image and the data transmission amount of the second original image are the same.

For example, as shown in FIG. 9B, in other embodiments, the original image 900 can be divided into 9 sub-regions by using the four vertices of the first region 910, and the first region 910 is one of the 9 sub-regions. The second region 920 comprises 8 sub-regions of the 9 sub-regions, and the 8 sub-regions are a first sub-region 931 to an eighth sub-region 938, respectively. The first sub-region 931, the third sub-region 933, the sixth sub-region 936, and the eighth sub-region 938 are not adjacent to the first region 910 in the original image 900, the fourth sub-region 934 and the fifth sub-region 935 are adjacent to the first region 910 in the original image 900 in the first direction Q1, and the second sub-region 932 and the seventh sub-region 937 are adjacent to the first region 910 in the original image 900 in the second direction Q2.

For example, in the step S120, performing the second processing on the second region comprises: in the first direction, performing compression processing on the first sub-region, the fourth sub-region, and the sixth sub-region in the original image according to a parameter FF1; in the first direction, performing compression processing on the third sub-region, the fifth sub-region, and the eighth sub-region in the original image according to a parameter FF2; in the second direction, performing compression processing on the first sub-region, the second sub-region, and the third sub-region in the original image according to a parameter FF3; and in the second direction, performing compression processing on the sixth sub-region, the seventh sub-region, and the eighth sub-region in the original image according to a parameter FF4.

For example, as shown in FIG. 9C, the original image 900 can be divided into 9 sub-regions. In this case, the first region 910 is one of the 9 sub-regions, and the second region 920 comprises 8 sub-regions of the 9 sub-regions, and the 8 sub-regions are a first sub-region 941 to an eighth sub-region 948, respectively. The first sub-region 941, the third sub-region 943, the sixth sub-region 946, and the eighth sub-region 948 are adjacent to the first region 910 in the first direction Q1 and in the second direction Q2, the fourth sub-region 944 and the fifth sub-region 945 are adjacent to the first region 910 in the first direction Q1, and the second sub-region 942 and the seventh sub-region 947 are adjacent to the first region 910 in the second direction Q2.

For example, in the example shown in FIG. 9C, the 8 sub-regions may be compressed according to different parameters. For example, in some examples, in order to ensure that the overall shape of the first processed region and the second processed region is a rectangle, the side of the first sub-region 941 after compressed, the side of the fourth sub-region 944 after compressed, and the side of the sixth sub-region 946 after compressed, which are away from the fifth sub-region 945 after compressed, are on the same straight line; the side of the third sub-region 943 after compressed, the side of the fifth sub-region 945 after compressed, and the side of the eighth sub-region 948 after compressed, which are away from the fourth sub-region 944, are on the same straight line; the side of the first sub-region 941 after compressed, the side of the second sub-region 942 after compressed, and the side of the third sub-region 943 after compressed, which are away from the seventh sub-region 947, are on the same straight line; the side of the sixth sub-region 946 after compressed, the side of the seventh sub-region 947 after compressed, and the side of the eighth sub-region 948 after compressed, which are away from the second sub-region 942, are on the same straight line.

For example, in the example shown in FIG. 9D, in a case where the shape of the first region 910 is a circle, the original image 900 can be divided into 13 sub-regions, in this case, the first region 910 is one of the 13 sub-regions, the second region 920 in the original image 900 comprises 12 sub-regions 951-9512 of the 13 sub-regions. For the compression processing of the sub-regions 951 to 958, reference may be made to the above-mentioned compression processing procedure for the first sub-region 931 to the eighth sub-region 938. The sub-regions 959-9512 may not be processed, that is, in this case, the second processing corresponding to the sub-regions 959-9512 may be no processing. It should be noted that the sub-regions 959-9512 can also be processed appropriately, which can be specifically set according to actual conditions, and the present disclosure does not make specific restrictions.

It should be noted that the above-mentioned processing procedure for the second region is only illustrative and not restrictive. The specific processing procedure for each sub-region in the second region can be set according to actual conditions, and the present disclosure does not specifically limit this.

For example, in some embodiments, step S120 comprises: analyzing the original image to obtain at least one image block; performing the second processing on the at least one image block to obtain the second processed region.

For example, in some embodiments, a region other than the first region in the original image is a second region, in the step S120, analyzing the original image to obtain at least one image block comprises: dividing the second region into a plurality of image blocks that do not overlap with each other. Performing the second processing on the at least one image block to obtain the second processed region comprises: rearranging the plurality of image blocks to generate a rearrangement region; and performing the second processing on the rearrangement region to obtain the second processed region.

For example, any dividing method can be used to divide the second region according to parameters such as brightness, contrast, gray distribution, color distribution, and pixel number of the second region; a shape of the rearrangement region generated by rearranging the divided image blocks may be a regular shape or an irregular shape. In some examples, the shape of the rearrangement region may be a rectangle.

Figure 11:
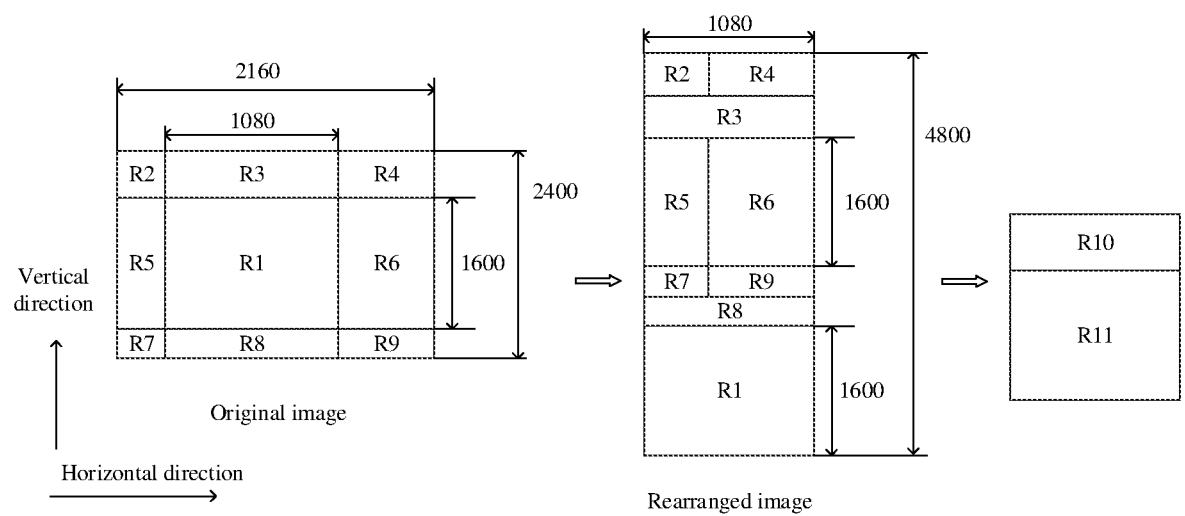
FIG. 11 is a schematic diagram of a process of second processing provided by an embodiment of the present disclosure.

FIG. 11 is a schematic diagram of a process of second processing provided by an embodiment of the present disclosure. As shown in FIG. 11, the length (the size in the horizontal direction in the figure, represented by the number of pixels) of the original image is 2160, and the width (the size in the vertical direction in the figure, represented by the number of pixels) of the original image is 2400. The region R1 is the first region, the length of the first region R1 is 1080, the width of the first region R1 is 1600, the second region is divided along extension lines of the sides of the first region R1, thus obtaining the image blocks R2, R3, R4, R5, R6, R7, R8, and R9; the length of the image block R3 and the length of the image block R8 must be the same as the length of the first region R1; because the length of the first region R1 is half the length of the original image, the sum of the length of the image block R5 and the length of the image block R6, the sum of the length of the image block R2 and the length of the image block R4, and the sum of the length of the image block R7 and the length of the image block R9 must also be equal to the length of the first region R1. These image blocks R2-R9 can be rearranged and combined with the first region R1 to obtain the rearranged image in FIG. 11, the region other than the first region R1 in the rearranged image is the rearranged region, and the shape of the rearranged region is a rectangle. The rearrangement region is then subjected to the second processing to obtain the second processed region R10.

For example, the shape of the second processed region R10 may be a rectangle, and the size of the second processed region R10 may be determined according to actual conditions.

For example, in some embodiments, the shape of the first processed region and the shape of the second processed region are both rectangular, a size of at least one side of the first processed region is identical with a size of at least one side of the second processed region, respectively. As shown in FIG. 11, the first processing is performed on the first processed region R1 to obtain the first processed region R11, the shape of the first processed region R11 is a rectangle, the shape of the second processed region R10 is also a rectangle, the length of the first processed region R11 is the same as the length of the second processed region R10.

In the present disclosure, by rearranging the plurality of image blocks of the second region to obtain the rearrangement region, and then performing the second processing on the rearrangement region, the processing on the second region can be made more convenient, and at the same time, a size of at least one side of the first processed region is identical with a size of at least one side of the second processed region, respectively, the second processed region obtained can be directly combined with the first processed region to form a rectangular first image, thereby facilitating data transmission, there is no need to add extra pixels with a pixel value of 0 in the rectangular first image, further reducing the data amount that needs to be transmitted. In addition, during the display process, the process of reading and analyzing data is convenient and simple.

It should be noted that "a size of at least one side of the first processed region being identical with a size of at least one side of the second processed region respectively" can indicate the following cases: a case that a size of a length of the first processed region is identical with a size of a length of the second processed region and/or a size of a width of the first processed region is identical with a size of a width of the second processed region; a case that a size of a length of the first processed region is identical with a size of a width of the second processed region and/or a size of a width of the first processed region is identical with a size of a length of the second processed region, and the like, so long as a size of one side of the first processed region is identical with a size of one side of the second processed region.

For example, in the subsequent process of decompressing the second processed region R10, according to the method corresponding to the rearrangement method, respective processed image blocks in the second processed region are restored, so that the positional relationship of the respective processed image blocks in the second processed region is the same as the positional relationship of respective image blocks in the original image, and then the decompression processing corresponding to the second processing is performed on the respective processed image blocks. For example, in the subsequent process of decompressing the second processed region R10, the decompression processing corresponding to the second processing is performed on the second processed region to obtain a decompressed region, that is, the second processed region as a whole is decompressed, and then according to the method corresponding to the rearrangement method, respective image blocks in the decompressed region are restored, the positional relationship of the respective image blocks in the decompressed region is the same as the positional relationship of respective image blocks in the original image.

For example, in some examples, in the step S120, the at least one image block comprises the original image, that is, the original image is used as one image block; performing the second processing on the at least one image block to obtain the second processed region comprises: directly performing the second processing (such as down-scaling processing) on the original image to obtain the second processed region.

For example, in some embodiments, the step S120 may comprise: directly performing the second processing on the original image to obtain the second processed region. In this case, during the display process, the first processed region may be processed as a whole by the display device and the second processed region may be processed as a whole by the display device. For example, the display device performs analyzing processing on the first processed region by using a first analyzing algorithm to obtain a first to-be-displayed region, performs analyzing processing on the second processed region by using a second analyzing algorithm to obtain a second to-be-displayed region, and displays the first to-be-displayed region and the second to-be-displayed region in a time division mode, finally, the second to-be-displayed region and the second to-be-displayed region are synthesized into the second image in the human eyes, the human can see the second image with a fixation point rendering effect. For example, the first to-be-displayed region may be displayed in half of a display period and the second to-be-displayed region may be displayed in half of a display period.

Figure 12A:
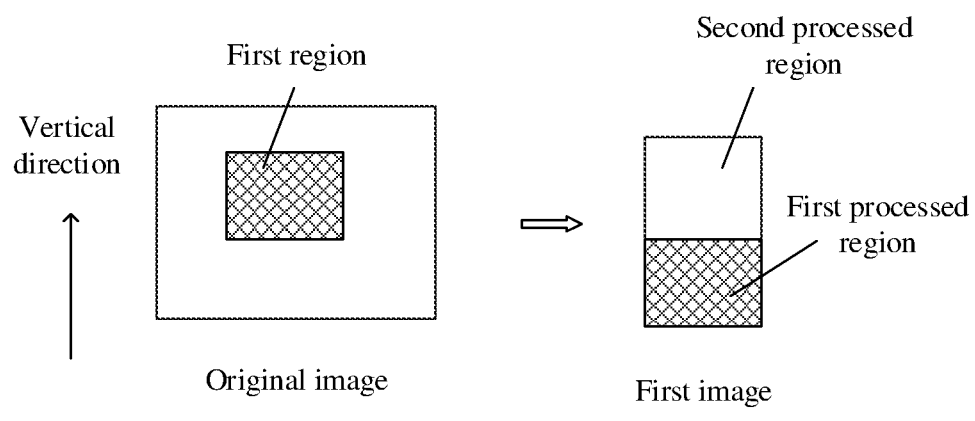
FIG. 12A is a schematic diagram of a process of generating a first image provided by some embodiments of the present disclosure.

FIG. 12A is a schematic diagram of a process of generating a first image provided by some embodiments of the present disclosure.

For example, as shown in FIG. 12A, the second processing can be directly performed on the original image to obtain the second processed region, and the first processing is performed on the first region to obtain the first processed region. For example, a shape of the first processed region and a shape of the second processed region are both rectangular, a size of at least one side (for example, in the example shown in FIG. 12A, the length, namely the size of the first processed region in the horizontal direction) of the first processed region is identical with a size of at least one side (for example, in the example shown in FIG. 12A, the length, namely the size of the second processed region in the horizontal direction) of the second processed region, respectively. In the example shown in FIG. 12A, there is no need to add extra pixels with a pixel value of 0 in the first image, further reducing the data amount that needs to be transmitted.

For example, in the step S130, the first processed region and the second processed region may be directly combined to obtain the first image. In the example shown in FIG. 12A, the data amount of the first image finally obtained is less than the data amount of the original image, so that the transmission bandwidth can be saved and the data transmission pressure can be reduced.

It should be noted that, in the example shown in FIG. 12A, it is necessary to perform the second processing on the original image under the premise of ensuring the display effect (ensuring that the displayed image does not appear obvious graininess, and ensuring the smooth transition between different regions).

For example, in some examples, the step S130 may comprise: determining a to-be-transmitted region based on the first processed region and the second processed region; generating the first image based on the to-be-transmitted region and the second processed region.

For example, the shape of the second processed region is a rectangle. A size of the to-be-transmitted region is greater than a size of the first processed region, the to-be-transmitted region comprises the first processed region, a shape of the to-be-transmitted region is a rectangle, and a size of at least one side of the to-be-transmitted region is identical with a size of at least one side of the second processed region.

For example, in some examples, the step S130 may comprise: determining a to-be-transmitted region based on the first processed region and the second processed region; generating the first image based on the to-be-transmitted region and the first processed region. For example, the to-be-transmitted region comprises the second processed region, a shape of the to-be-transmitted region is a rectangle, and a size of at least one side of the to-be-transmitted region is identical with a size of at least one side of the first processed region.

Figure 12B:
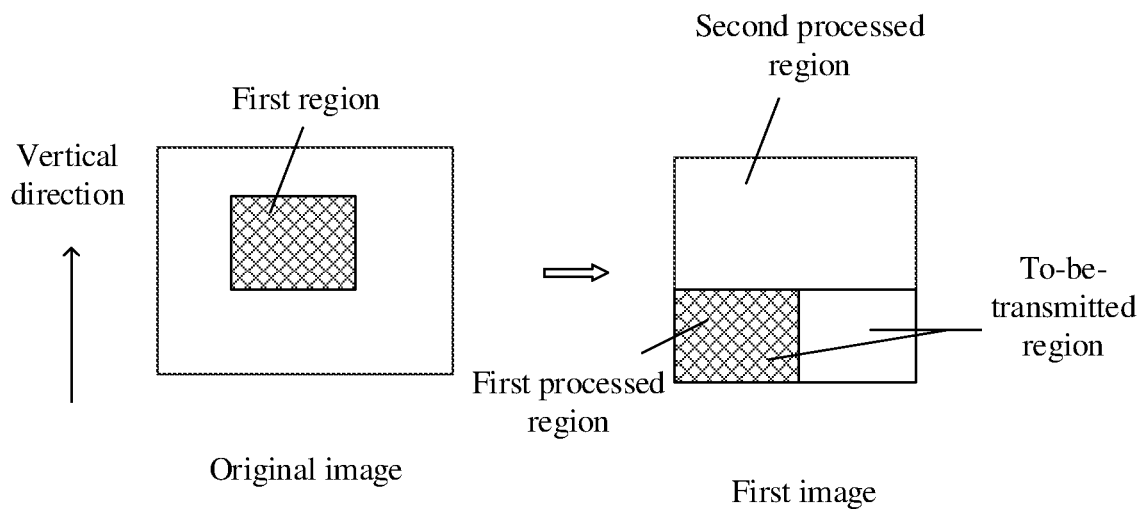
FIG. 12B is a schematic diagram of another process of generating a first image provided by some embodiments of the present disclosure.

FIG. 12B is a schematic diagram of another process of generating a first image provided by some embodiments of the present disclosure.

For example, as shown in FIG. 12B, the size of any one side in the first processed region is smaller than the size of any one side in the second processed region.

For example, the to-be-transmitted region can be determined based on the width of the first processed region (for example, the size of the first processed region in the vertical direction in the example shown in FIG. 12B) and the length of the second processed region (for example, the size of the first second region in the horizontal direction in the example shown in FIG. 12B). That is, the length of the to-be-transmitted region is the same as the length of the second processed region, and the width of the to-be-transmitted region is the same as the width of the first processed region.

For example, the pixel values of pixels in the to-be-transmitted region except for the first processed region can be set to 0.

For example, in the example shown in FIG. 12B, the to-be-transmitted region and the second processed region can be directly combined to obtain the first image. The shape of the second processed region is not limited by the first processed region, and the processing parameter of the second processing can be set arbitrarily according to the actual region, as long as the display effect can be ensured, thereby making the second processing more flexible, and the data amount of the finally obtained first image is also less than the data amount of the original image, which can save transmission bandwidth. It should be noted that in the example shown in FIG. 12B, the size of the to-be-transmitted region may be the same as that of the first processed region, this case is the same as the case shown in FIG. 12A.

It should be noted that the first processed region and the second processed region can also be transmitted, separately. In this case, the shape of the second processed region is not limited by the first processed region, and the processing parameter of the second processing can be set arbitrarily according to the actual region.

For example, in some embodiments, the image processing method further comprises: outputting the first image to a display device. The display device can processes the first image to obtain the second image and display the second image. For example, the display device processes the first processed region by using a first analyzing algorithm and processes the second processed region by using a second analyzing algorithm to obtain a second image, and the display device displays the second image.

For example, the display device can also perform backlight adjustment, color increase, and other operations.

For example, the second analyzing algorithm corresponds to the second processing. For example, in a case where the second processing comprises down-scaling processing, the second analyzing algorithm may comprise up-scaling algorithm to achieve up-scaling processing. For example, the down-scaling processing may be compression processing, and the up-scaling processing may be the decompression processing. For example, the second analyzing algorithm may comprise a stretch algorithm, so that the display device stretches the second processed region.

In the image processing method provided by the embodiment of the present disclosure, the original image is processed before sending to obtain the first image, and the first image with a small data amount is actually sent, so that the transmission bandwidth can be saved, the amount of data transmitted and entering the buffer is reduced, thus reducing the system load.

For example, a resolution corresponding to the first analyzing algorithm is greater than a resolution corresponding to the second analyzing algorithm.

For example, the resolution of the first analyzing algorithm may be a full resolution. Therefore, the first processed region may be displayed in high-definition. For example, each pixel in the display device can display based on one pixel data in the first processed region, every several pixels in the display device may display based on one pixel data in the second processed region. But the present disclosure is not limited thereto, the correspondence between the pixel data in the first processed region and the pixels in the display device and the correspondence between the pixel data in the second processed region and the pixels in the display device can be set according to actual conditions.

For example, in a case where the second processing includes compression processing, the display device may decompress the second processed region according to the decompression processing corresponding to the compression processing. For example, the second processed region can be decompressed by the nearest neighbor interpolation or bilinear interpolation.

For example, the display device may analyze the first processed region or the second processed region to obtain at least one parameter pixel data, and then obtain the processing parameter corresponding to the second processing based on the at least one parameter pixel data, thereby determining the parameter corresponding to the second analyzing algorithm.

For example, the size of the second image may be the same as the size of the original image.

At present, due to the limitation of the current information transmission speed, for high-resolution screens, the only way to display the screen in real time is to reduce the output resolution or reduce the refresh rate. In the image processing method provided by the present disclosure, different regions are processed differently, for example, the first region is obtained by rendering with a high-definition resolution, and the original image is obtained by rendering with a low-resolution; then the high-definition region obtained by analyzing with the high-definition resolution and the non-high-definition region obtained by analyzing with the low-resolution are stitched to synthesize an image, the data amount of the image is less than the data amount of the original image; then the image is transmitted from the image processing device to the display device, and the display device decompresses the non-high-definition region in the image to obtain the decompressed region and splices the decompressed region with the high-definition region, thereby achieving the gaze point rendering effect while reducing the amount of data transmission.

For example, in some embodiments, before step S100, the image processing method further comprises: generating an original image. Generating the original image may comprise: performing rendering processing on a virtual reality scene to obtain the original image. The original image corresponds to the virtual reality scene.

For example, in the present disclosure, "rendering" indicates a process of converting 3D data in the virtual reality scene into 2D pixel data (that is, 2D image), that is, the result of the rendering is to obtain the pixel data. The "rendering" indicates the graphics rendering. The graphics rendering pipeline is considered to be the core of real-time graphics rendering. The main function of the graphics rendering pipeline is to generate or render a two-dimensional image by a given virtual camera, three-dimensional object, light source, lighting model, texture map, and the like. Usually, the graphics rendering pipeline is divided into three stages: the application stage (implemented by CPU), the geometry stage (implemented by GPU), and the rasterization stage. The application stage comprises vertex shader and shape assembly, the geometry stage comprises geometry shader, and the rasterization stage comprises rasterization, fragment shader, and tests and blending.

In the application stage, it is developed through high-level programming languages (C, C++, Java, or the like) and deals with CPU and memory, the main task is to identify potential visual grid instances and transmit the grid instances and their materials to graphics hardware for rendering. In the application stage, geometry data will be generated, and the geometry data comprises vertex coordinates, normal vectors, texture coordinates, textures, etc., and will be transmitted to the graphics hardware through the data bus for rendering. The application phase is responsible for driving the GPU pipeline. In the geometric stage, the main work can be summarized as "transforming 3D vertex coordinates" and "lighting calculation". The specific processes comprises vertex coordinate transformation, illumination, cropping, projection, and screen mapping. The geometric stage is calculated based on GPU. In the geometric stage, the vertex coordinates, color, and texture coordinates after transformation and projection are obtained. In the rasterization stage, the purpose of rasterization is to calculate the color value of each pixel. In the rasterization stage, the triangles sent from the geometry stage are converted into fragments, and the fragments are colored (that is, fragment shader). After the fragments are processed by cropping test, alpha test, mask test, depth test, fusion, etc., the fragments are finally blended with the frame buffer.

For example, the original image is an image to be displayed that is obtained by rendering through the image processing device according to the current state of the virtual reality scene. The content to be displayed can be determined according to the state of the virtual reality or augmented reality equipment, and then the rendering module (for example, a graphics processing unit (GPU)) in the image processing device performs rendering on the content to be displayed to obtain the original image. The original image needs to be sent to the display device of the virtual reality or augmented reality equipment for actual display.

For example, in some embodiments, the original image may include a plurality of first regions, and the plurality of first regions may be processed differently, so as to meet more needs. After the plurality of first regions are processed differently, a plurality of first processed regions that are in one-to-one correspondence to the plurality of first regions can be obtained, and the resolutions corresponding to the plurality of first processed regions can be different from each other, or can also be at least partially the same. The resolution of each first processed region is greater than that of the second processed region. When the second processed region includes a plurality of sub-regions, the resolution of each first processed region is greater than that of any one sub-region in the second processed region.

For example, sub-pixels in the original image and sub-pixels in the first image may be arranged according to a standard RGB array arrangement manner; sub-pixels in the second image are arranged according to a Bright View 3 (BV3) array arrangement manner. The BV3 array arrangement manner is a delta (A) array arrangement manner, and may increase the visual resolution and improve the image quality. The present disclosure is not limited to this, and the respective sub-pixels in each of a group consisting of the original image, the first image, and the second image may also be arranged in the manner of pixel islands (that is, the RGB vertical arrangement) or other suitable manners.

Figure 13A:
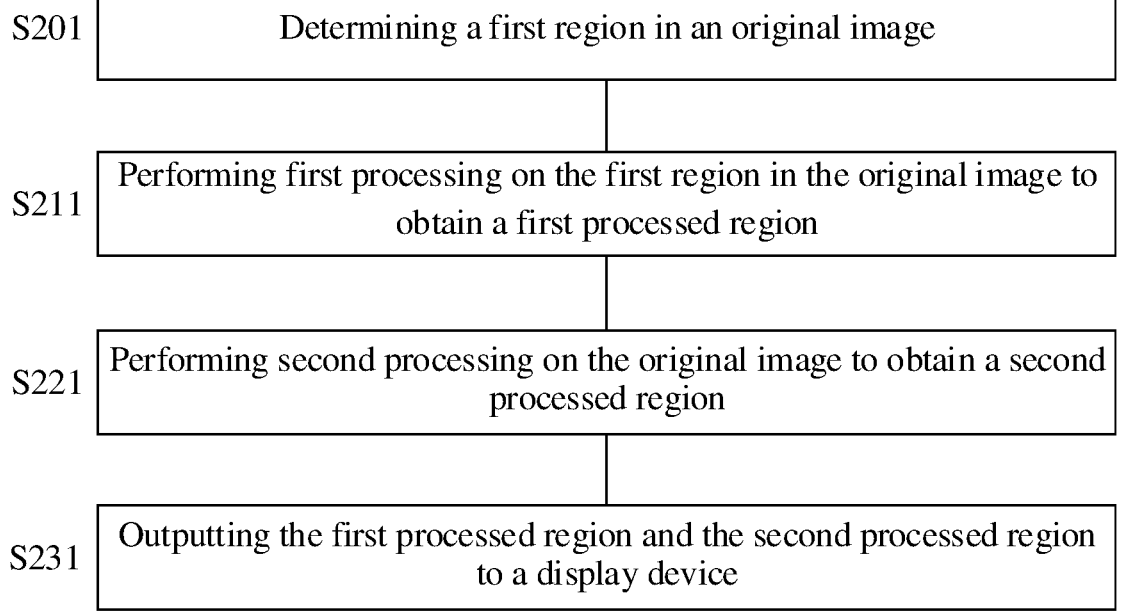
FIG. 13A is a schematic flowchart of another image processing method provided by at least one embodiment of the present disclosure.

FIG. 13A is a schematic flowchart of another image processing method provided by at least one embodiment of the present disclosure.

Figure 13B:
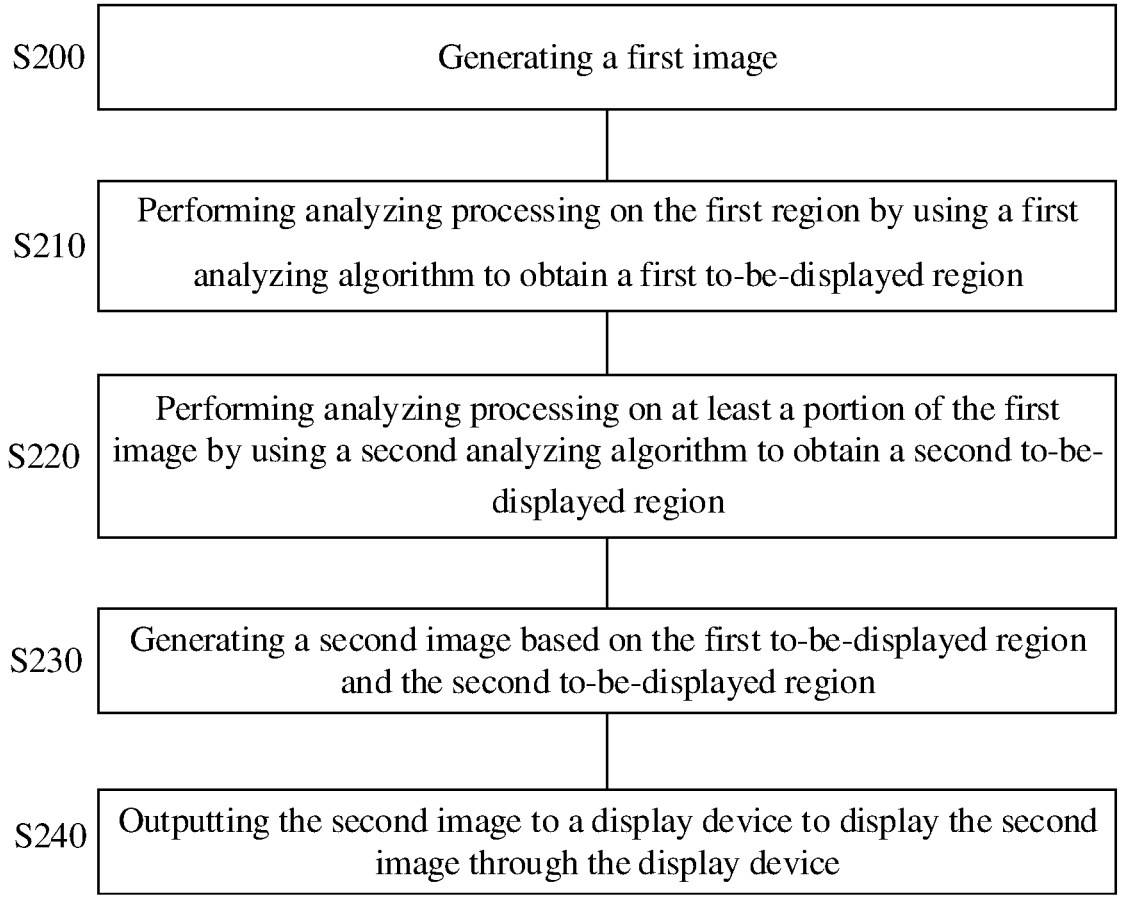
FIG. 13B is a schematic flowchart of still another image processing method provided by at least one embodiment of the present disclosure.

As shown in FIG. 13B, the image processing method may include the following steps S201 to S231.

S201: determining a first region in an original image.

S211: performing first processing on the first region in the original image to obtain a first processed region.

S221: performing second processing on the original image to obtain a second processed region.

S231: outputting the first processed region and the second processed region to a display device.

For example, a resolution of the first processed region is greater than a resolution of the second processed region.

For the detail description of steps S201~S221, reference may be made to the above description of steps S100~S120, repeated portions will not repeated here.

In the step S231, the display device performs analyzing processing on the first processed region by using a first analyzing algorithm to obtain a first to-be-displayed region, performs analyzing processing on the second processed region by using a second analyzing algorithm to obtain a second to-be-displayed region, and the display device displays the first to-be-displayed region and the second to-be-displayed region.

In the embodiments, the first processed region and the second processed region are transmitted to the display device, separately, so that the shape of the second processed region is not limited by the first processed region, and the processing parameter of the second processing can be set arbitrarily according to the actual region. Besides, the image processing device does not need to generate the first image, thereby simplifying the processing processes of the image processing device.

FIG. 13B is a schematic flowchart of still another image processing method provided by at least one embodiment of the present disclosure. At least some embodiments of the present disclosure also provide an image processing method. For example, the image processing method can be applied to an image processing device.

As shown in FIG. 13B, the image processing method may include the following steps S200 to S240.

S200: generating a first image. The first image comprises a first region.

S210: performing analyzing processing on the first region by using a first analyzing algorithm to obtain a first to-be-displayed region.

S220: performing analyzing processing on at least a portion of the first image by using a second analyzing algorithm to obtain a second to-be-displayed region.

S230: generating a second image based on the first to-be-displayed region and the second to-be-displayed region.

S240: outputting the second image to a display device to display the second image through the display device.

For example, a resolution corresponding to the first analyzing algorithm is greater than a resolution corresponding to the second analyzing algorithm, a resolution of a region in the first image other than the first region is less than a resolution of the first region, and a resolution of the first to-be-displayed region is greater than a resolution of the second to-be-displayed region.

For example, the size of the first image is smaller than the size of the second image.

For example, the region in the first image other than the first region is a second region.

For example, the first image is an image obtained by rendering a virtual reality scene by an image processing device. For example, in some embodiments, the step S200 comprises: using a first scene rendering algorithm to render a target part of a virtual reality scene to generate the first region of the first image, and using a second scene rendering algorithm to render a region other than the target part in the virtual reality scene to generate the second region of the first image. In this embodiment, the first image may include the first region and the second region.

For example, in other embodiments, the step S200 comprises: using a first scene rendering algorithm to render a target part of a virtual reality scene to generate the first region of the first image; using a second scene rendering algorithm to render the virtual reality scene to generate a scene rendering region; and obtaining a first image based on the position information of the first region, the first region, and the scene rendering region. The scene rendering region corresponds to the virtual reality scene, the resolution of the scene rendering region is smaller than the resolution of the first region, and the scene rendering region comprises a partial region corresponding to the first region, in this embodiment, the first image may comprise the scene rendering region, the first region, and information used to characterize the position of the first region in the scene rendering region.

For example, a resolution corresponding to the first scene rendering algorithm is greater than a resolution corresponding to the second scene rendering algorithm.

In the image processing method provided by the embodiment of the present disclosure, the image processing device can directly perform rendering processing with a low resolution on the region in the virtual reality scene except the target part and perform rendering processing with a high-definition resolution on the target part, so as to generate the first image, thereby reducing the amount of data needed to be rendered, reducing rendering pressure, and reducing rendering time. Moreover, the image processing device renders the first image, and transmits the rendered second image to the display device, and the display device can directly display the second image, therefore, the display device may not need to have a rendering function, and the display device may be implemented by a common driving chip, reducing the complexity of the display device.

For example, the target part of the virtual reality scene may be the part where human eyes are gazing.

For another example, in step S200, the image processing method shown in FIG. 8 may also be used to generate the first image.

For example, in step S220, in some examples, in a case where the first image comprises the scene rendering region, the first region, and information used to characterize the position of the first region in the scene rendering region, and the at least a portion of the first image comprises the scene rendering region. The second analyzing algorithm may be used to directly perform analyzing processing on the scene rendering region to obtain the second to-be-displayed region, in this case, the second to-be-displayed region corresponds to the scene rendering region; in other examples, in a case where the first image only comprises the first region and the second region, and the at least a portion of the first image comprises the second region, the second analyzing algorithm may be used to perform analyzing processing on the second region to obtain the second to-be-displayed region, in this case, the second to-be-displayed region corresponds to the second region.

For example, when the second to-be-displayed region corresponds to the scene rendering region, the first image further comprises a plurality of pixels corresponding to a plurality of labeled pixel data, and the plurality of labeled pixel data are used to represent a position of the first region in the first image, that is, represent a position of the first region in the scene rendering region. For example, the step S230 comprises: obtaining the plurality of labeled pixel data; determining a position of the first to-be-displayed region in the second to-be-displayed region based on the plurality of labeled pixel data; based on the position of the first to-be-displayed region in the second to-be-displayed region, superimposing the first to-be-displayed region on the second to-be-displayed region to obtain the second image. It should be noted that, for the plurality of labeled pixel data, reference may be made to the related description of the plurality of labeled pixel data in the above embodiment.

Figure 14:
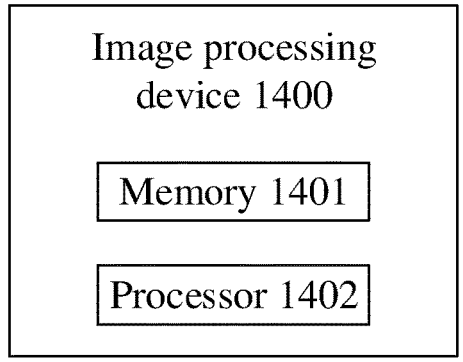
FIG. 14 is a schematic block diagram of an image processing device provided by at least one embodiment of the present disclosure.

FIG. 14 is a schematic block diagram of an image processing device provided by at least one embodiment of the present disclosure.

At least one embodiment of the present disclosure provides an image processing device.

As shown in FIG. 14, the image processing device 1400 may include a memory 1401 and a processor 1402. The memory 1401 is configured to storage computer-readable instructions non-transiently; the processor 1402 is configured to run the computer-readable instructions. For example, when the computer-readable instructions are executed by the processor, the image processing method shown in FIG. 8 can be implemented. For another example, when the computer-readable instructions are executed by the processor, the image processing method shown in FIG. 13B can also be implemented. It should be noted that the components of the image processing device 1400 shown in FIG. 14 are only exemplary and not restrictive. According to actual application requirements, the image processing device 1400 may also have other components.

For the specific implementation of each step of the image processing method and related explanation content, reference may be made to the above-mentioned embodiment of the image processing method, and similar portions will not be repeated here.

For example, the processor 1402 and the memory 1401 may directly or indirectly communicate with each other.

For example, the processor 1402 and the memory 1401 may communicate through a network. For example, the network may comprise a wireless network, a wired network, and/or any combination of the wireless network and the wired network. The present disclosure does not limit types and functions of the network herein. The network may include a local area network, an internet, a telecommunication network, an Internet of Things based on the internet and/or telecommunication network, and/or any combinations of the above networks, or the like. For example, the wired network may communicate by means such as a twisted pair, coaxial cable or optical fiber transmission. The wireless network may communicate by means such as 3G/4G/5G mobile communication networks, Bluetooth, Zigbee, or WiFi.

For another example, the processor 1402 and the memory 1401 may also communicate through a bus. The bus can be a peripheral component interconnection standard (PCI) bus or an extended industry standard architecture (EISA) bus, and the like.

For example, the processor 1402 and the memory 1401 may be set on the server side (or the cloud), or on the client side (for example, mobile devices such as mobile phones).

For example, the processor 1402 may be a central processing unit (CPU) or other forms of processing unit having data processing capabilities and/or program execution capabilities, such as a graphics processing unit (GPU), a field-programmable gate array (FPGA), a tensor processing unit (TPU), or the like. The processor 1402 may control other components in the image processing device 1400 to perform desired functions. For example, the central processing unit (CPU) may be an X86, ARM architecture, or the like.

For example, the memory 1401 may comprise an arbitrary combination of one or more computer program products.

The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. For example, one or more computer-executable instructions may be stored on the memory 1401, and the processor 1402 may execute the computer-executable instruction, so as to implement various functions of the image processing device 1400. Various applications, various data such as the conversion coefficients, and various data used and/or generated by the applications, and the like, may also be stored in the memory 1401.

It should be noted that the image processing device 1400 can achieve technical effects similar to the foregoing image processing method, and the repetition will not be repeated.

Figure 15:
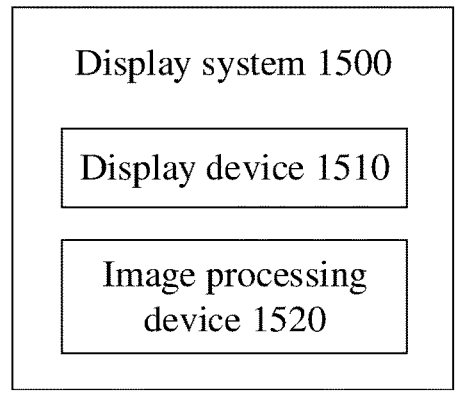
FIG. 15 is a schematic block diagram of a display system provided by at least one embodiment of the present disclosure.
Figure 16A:
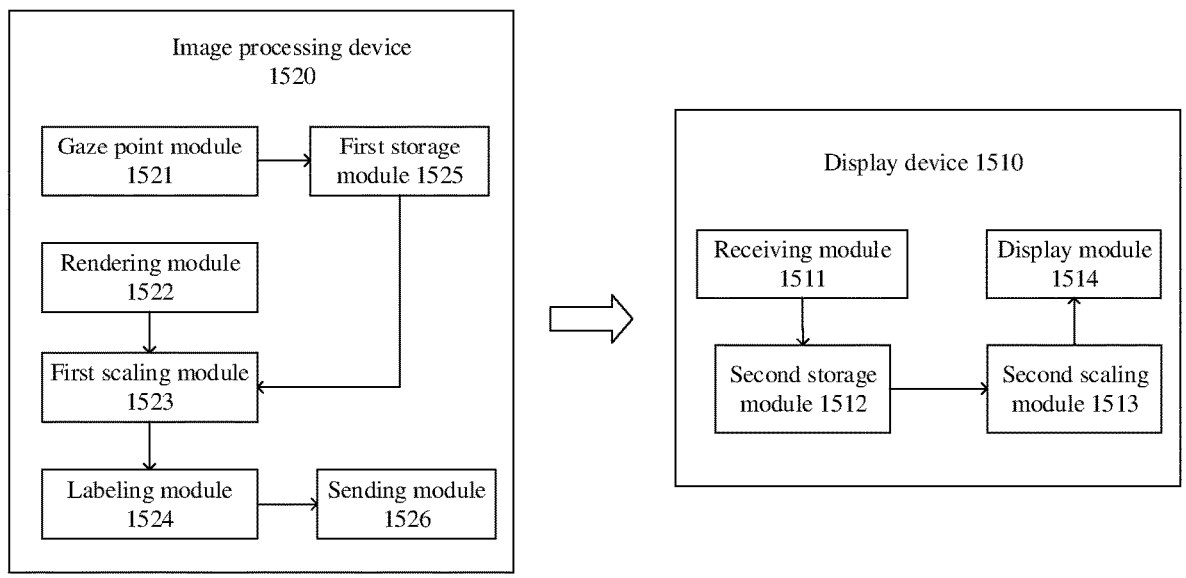
FIG. 16A is a schematic diagram of a display system provided by at least one embodiment of the present disclosure.

FIG. 15 is a schematic block diagram of a display system provided by at least one embodiment of the present disclosure. FIG. 16A is a schematic diagram of a display system provided by at least one embodiment of the present disclosure.

At least one embodiment of the present disclosure provides a display system.

For example, as shown in FIG. 15, the display system 1500 may include a display device 1510 and an image processing device 1520.

For example, in some embodiments, as shown in FIG. 16A, the image processing device 1520 may include a gaze point module 1521, a rendering module 1522, a first scaling module 1523, a labeling module 1524, a first storage module 1525, and a sending module 1526. The image processing device 1520 shown in FIG. 16A can be used to implement the image processing method shown in FIG. 8.

For example, in a case where the target pixel is the gaze point of the human eye on the original image, the gaze point module 1521 is configured to determine the gaze point information of the human eye, and the gaze point information includes the gaze point of the human eye on the original image. The gaze point module 1521 may also send the gaze point information to the first storage module 1525 for storage by the first storage module 1525.

For example, in a case where the target pixel is a preset pixel, the first storage module 1525 may store related information of the preset pixel, for example, the coordinate value of the preset pixel. In this case, the gaze point module 1521 may not be provided.

For example, the first storage module 1525 may also store a distance threshold, or the first storage module 1525 may also store information such as a predetermined size and a predetermined shape corresponding to the first region.

For example, in some embodiments, the gaze point module 1521 may include an image acquisition module (including a camera) and a processor (for example, GPU). First, the image acquisition module acquires the eyeball image of the user, and then, the processor processes the eyeball image to determine the pupil center of the user, and maps the pupil center to the original image to determine the gaze point of the human eye on the original image. For example, the mapping point of the pupil center on the original image is taken as the gaze point of the human eye on the original image.

For example, in some embodiments, the first storage module 1525 may be implemented as a cache or the like. The present disclosure is not limited to this, and the first storage module 1525 can also be implemented as any component that can store data.

For example, in the example shown in FIG. 8, the rendering module 1522 is configured to render a scene (for example, a virtual reality scene) to generate a two-dimensional original image.

For example, the rendering module 1522 may be implemented as a rendering engine. The rendering engine may include a shader, and the shader is a piece of software program that is used to set the rendering rules for rendering the image.

For example, the rendering module 1522 may include a plurality of rendering pipelines to perform rendering in parallel.

For example, the rendering module 1522 may transmit the generated original image to the first scaling module 1523.

For example, the first scaling module 1523 is configured to determine the first region in the original image, that is, the first scaling module 1523 is used to implement step S100 shown in FIG. 8 and step S201 in FIG. 13A.

For example, in some examples, the first scaling module 1523 is configured to obtain the target pixel (for example, the gaze point of the human eye on the original image or the preset pixel) and a distance threshold from the first storage module 1525, and determine the first region in the original image based on the target pixel and the distance threshold. For example, the distance between each pixel in the first region and the target pixel is less than or equal to the distance threshold.

For example, in other examples, the first scaling module 1523 is configured to obtain the target pixel (for example, the gaze point of the human eye on the original image or the preset pixel), the predetermined size, and the predetermined shape from the first storage module 1525, and determine the first region in the original image based on the target pixel, the predetermined size, and the predetermined shape. For example, the first region is a region located in the predetermined shape with the predetermined size centered on the target pixel.

For example, a shape of the first region may be a rectangle, a diamond, a circle, an ellipse, a cross shape, or a triangle, or the like.

For example, in some embodiments, the labeled pixel data used to indicate the position of the first region in the original image and/or the parameter pixel data used to indicate the processing parameter corresponding to the second processing are included in the first processed region, in this case, the first scaling module 1523 and the labeling module 1524 jointly perform the operation of performing first processing on the first region in the original image to obtain the first processed region, that is, the first scaling module 1523 and the labeling module 1524 are used to implement step S110 shown in FIG. 8 and step S221 in FIG. 13A.

For example, in some embodiments, the first processed region includes the labeled pixel data, the first scaling module 1523 is configured to perform the first processing on the first region to obtain a plurality of first image pixel data corresponding to all pixels in the first region; and transmit the plurality of first image pixel data to the labeling module 1524. In some examples, the labeling module 1524 is configured to determine a plurality of boundary pixels in the original image based on a position of the first region in the original image; perform mapping processing on coordinate values of the plurality of boundary pixels to obtain a plurality of labeled pixel data; and obtain the first processed region based on the plurality of labeled pixel data and the plurality of first image pixel data. For example, the first region is a region defined by the plurality of boundary pixels in the original image. In other examples, the size of the first region is a fixed size, in this case, the first storage module 1525 may also store size information of the first region, the labeling module 1524 is configured to obtain the size information of the first region from the first storage module 1525; determine at least one labeled pixel in the original image based on a position of the first region in the original image; perform mapping processing on a coordinate value of the at least one labeled pixel and the size information of the first region to obtain a plurality of labeled pixel data; and obtain the first processed region based on the plurality of labeled pixel data and the plurality of first image pixel data.

For example, in some embodiments, the first processed region includes the labeled pixel data and the parameter pixel data, the first scaling module 1523 is configured to perform the first processing on the first region to obtain a plurality of first image pixel data corresponding to all pixels in the first region; and transmit the plurality of first image pixel data to the labeling module 1524. In some examples, the first storage module 1525 may also store the processing parameter corresponding to the second processing, and the labeling module 1524 is configured to obtain the processing parameter corresponding to the second processing from the first storage module 1525; determine a plurality of boundary pixels in the original image based on a position of the first region in the original image; perform mapping processing on coordinate values of the plurality of boundary pixels to obtain a plurality of labeled pixel data; perform mapping processing on the processing parameter corresponding to the second processing to obtain at least one parameter pixel data; and obtain the first processed region based on the plurality of labeled pixel data, the at least one parameter pixel data, and the plurality of first image pixel data. In other examples, the size of the first region is a fixed size, in this case, the first storage module 1525 may also store the size information of the first region and the processing parameter corresponding to the second processing, the labeling module 1524 is configured to obtain the size information of the first region and the processing parameter corresponding to the second processing from the first storage module 1525; determine at least one labeled pixel in the original image based on a position of the first region in the original image; perform mapping processing on a coordinate value of the at least one labeled pixel and size information of the first region to obtain a plurality of labeled pixel data; perform mapping processing on the processing parameter corresponding to the second processing to obtain at least one parameter pixel data; and obtain the first processed region based on the plurality of labeled pixel data, the at least one parameter pixel data, and the plurality of first image pixel data.

For example, in some embodiments, the labeled pixel data used to indicate the position of the first region in the original image and/or the parameter pixel data used to indicate the processing parameter corresponding to the second processing are included in the second processed region, in this case, the first scaling module 1523 and the labeling module 1524 jointly perform the operation of performing second processing on the original image to obtain a second processed region, that is, the first scaling module 1523 and the labeling module 1524 are used to implement step S120 shown in FIG. 8 and step S221 in FIG. 13A.

For example, in some embodiments, the second processed region includes the labeled pixel data, the first scaling module 1523 is configured to perform the second processing on the original image to obtain a plurality of second image pixel data corresponding to at least some pixels of the original image; and transmit the plurality of second image pixel data to the labeling module 1524. In some examples, the labeling module 1524 is configured to determine a plurality of boundary pixels in the original image based on a position of the first region in the original image; perform mapping processing on coordinate values of the plurality of boundary pixels to obtain a plurality of labeled pixel data; and obtain the second processed region based on the plurality of labeled pixel data and the plurality of second image pixel data. For example, the first region is a region defined by the plurality of boundary pixels in the original image. In other examples, the size of the first region is a fixed size, in this case, the first storage module 1525 may also store size information of the first region, the labeling module 1524 is configured to obtain the size information of the first region from the first storage module 1525; determine at least one labeled pixel in the original image based on a position of the first region in the original image; perform mapping processing on a coordinate value of the at least one labeled pixel and the size information of the first region to obtain a plurality of labeled pixel data; and obtain the second processed region based on the plurality of labeled pixel data and the plurality of second image pixel data.

For example, in some embodiments, the second processed region includes the labeled pixel data and the parameter pixel data, the first storage module 1525 may also store the processing parameter corresponding to the second processing, for example, the first scaling module 1523 is configured to perform the second processing on the original image to obtain a plurality of second image pixel data corresponding to at least some pixels of the original image; obtain the processing parameter corresponding to the second processing from the first storage module 1525; perform mapping processing on the processing parameter corresponding to the second processing to obtain at least one parameter pixel data; and transmit the plurality of second image pixel data and the at least one parameter pixel data to the labeling module 1524. In some examples, the labeling module 1524 is configured to determine a plurality of boundary pixels in the original image based on a position of the first region in the original image; perform mapping processing on coordinate values of the plurality of boundary pixels to obtain a plurality of labeled pixel data; and obtain the second processed region based on the plurality of labeled pixel data, the at least one parameter pixel data, and the plurality of second image pixel data. In other examples, the size of the first region is a fixed size, in this case, the first storage module 1525 may also store the size information of the first region, the labeling module 1524 is configured to obtain the size information of the first region from the first storage module 1525; determine at least one labeled pixel in the original image based on a position of the first region in the original image; perform mapping processing on a coordinate value of the at least one labeled pixel and size information of the first region to obtain a plurality of labeled pixel data; and obtain the second processed region based on the plurality of labeled pixel data, the at least one parameter pixel data, and the plurality of second image pixel data.

For example, in some embodiments, in a case where the second processed region does not include the labeled pixel data and/or the parameter pixel data, the first scaling module 1523 is configured to perform the second processing on the original image to obtain the second processed region. For example, in some examples, the first scaling module 1523 is configured to determine a region other than the first region in the original image to obtain a second region; and perform the second processing on the second region to obtain the second processed region. It should be noted that, in this embodiment, the first processed region may not include the labeled pixel data and/or the parameter pixel data, that is, the image processing device 1520 does not transmit the labeled pixel data and/or the parameter pixel data to the display device 1510.

For example, in some embodiments, the second region in the original image comprises a first sub-region, a second sub-region, and a third sub-region, the first sub-region in the original image is adjacent to the first region in the original image in a first direction, the second sub-region in the original image is adjacent to the first region in the original image in a second direction, and the third sub-region in the original image is not adjacent to the first region in the original image, the first direction is perpendicular to the second direction.

For example, the second processing comprises compression processing. For example, in some examples, when performing the operation of performing the second processing on the second region, the first scaling module 1523 is configured to: in the first direction, perform compression processing on the first sub-region in the original image according to a first parameter; in the second direction, perform compression processing on the second sub-region in the original image according to a second parameter; and in the first direction, perform compression processing on the third sub-region in the original image according to the first parameter, and in the second direction, perform compression processing on the third sub-region in the original image according to the second parameter.

For example, in some embodiments, when the second processed region does not include the labeled pixel data and/or the parameter pixel data, the first scaling module 1523 is configured to perform the second processing on the original image to obtain the second processed region. When performing the second processing on the original image to obtain the second processed region, the first scaling module 1523 is configured to divide the second region into a plurality of image blocks that do not overlap with each other, and rearranging the plurality of image blocks to generate a rearrangement region; and perform the second processing on the rearrangement region to obtain the second processed region.

For example, in some embodiments, when the second processed region includes the labeled pixel data and/or the parameter pixel data, the first scaling module 1523 and the labeling module 1524 jointly perform the second processing on the original image to obtain the second processed region. For example, in a case where the second processed region includes the labeled pixel data, when performing the second processing on the second region to obtain the second processed region, the first scaling module 1523 is configured to divide the second region into a plurality of image blocks that do not overlap with each other, and rearranging the plurality of image blocks to generate a rearrangement region; and perform the second processing on the rearrangement region to obtain a plurality of third image pixel data; output the plurality of third image pixel data to the labeling module 1524; the labeling module 1524 is used to generate a plurality of labeled pixel data, and obtain the second processed region based on the plurality of labeled pixel data and the plurality of third image pixel data. For another example, when the second processed region includes the labeled pixel data and the parameter pixel data, when performing the second processing on the second region to obtain the second processed region, the first scaling module 1523 is configured to divide the second region into a plurality of image blocks that do not overlap with each other, and rearranging the plurality of image blocks to generate a rearrangement region; and perform the second processing on the rearrangement region to obtain a plurality of third image pixel data; generate at least one parameter pixel data; output the plurality of third image pixel data and the at least one parameter pixel data to the labeling module 1524; the labeling module 1524 is used to generate a plurality of labeled pixel data, and obtain the second processed region based on the at least one parameter pixel data, the plurality of labeled pixel data, and the plurality of third image pixel data.

For example, the shape of the rearrangement region is a rectangle.

For example, in some embodiments, the first scaling module 1523 and the labeling module 1524 jointly perform the second processing on the original image to obtain the second processed region. For example, in some examples, the first scaling module 1523 and the labeling module 1524 are combined to perform the second processing directly on the original image to obtain the second processed region. In this case, the second processed region may include the parameter pixel data and/or the labeled pixel data, for the specific processing process, reference may be made to the above-mentioned related description.

For example, a shape of the first processed region and a shape of the second processed region are both rectangular, a size of at least one side of the first processed region is identical with a size of at least one side of the second processed region, respectively.

For example, in some embodiments, the labeling module 1524 is further configured to generate the first image based on the first processed region and the second processed region, that is, the labeling module 1524 is used to implement step S130 shown in FIG. 8.

For example, in some embodiments, the labeling module 1524 is configured to determine a plurality of boundary pixels in the original image based on a position of the first region in the original image; perform mapping processing on coordinate values of the plurality of boundary pixels to obtain a plurality of labeled pixel data; and generate the first image based on the plurality of labeled pixel data, the first processed region and the second processed region. In some embodiments, the labeling module 1524 is configured to determine at least one labeled pixel in the original image based on a position of the first region in the original image; perform mapping processing on a coordinate value of the at least one labeled pixel and size information of the first region to obtain a plurality of labeled pixel data; and generate the first image based on the plurality of labeled pixel data, the first processed region and the second processed region. In some embodiments, the labeling module 1524 is configured to determine a plurality of boundary pixels in the original image based on a position of the first region in the original image, perform mapping processing on coordinate values of the plurality of boundary pixels to obtain a plurality of labeled pixel data; perform mapping processing on a processing parameter corresponding to the second processing to obtain at least one parameter pixel data, and generate the first image based on the plurality of labeled pixel data, the at least one parameter pixel data, the first processed region and the second processed region. In some embodiments, the labeling module 1524 is configured to determine at least one labeled pixel in the original image based on a position of the first region in the original image; perform mapping processing on a coordinate value of the at least one labeled pixel and size information of the first region to obtain a plurality of labeled pixel data; perform mapping processing on a processing parameter corresponding to the second processing to obtain at least one parameter pixel data; and generate the first image based on the plurality of labeled pixel data, the at least one parameter pixel data, the first processed region and the second processed region.

For example, in a case where the size of at least one side of the first processed region is identical with the size of at least one side of the second processed region, respectively, the labeling module 1524 is configured to directly combine (for example, splice) the first processed region and the second processed region to generate the first image.

For example, in a case where the size of any side of the first processed region is different from the size of any side of the second processed region, the labeling module 1524 is configured to determine a to-be-transmitted region based on the first processed region and the second processed region, and generate the first image based on the to-be-transmitted region and the second processed region. For example, the to-be-transmitted region comprises the first processed region, a shape of the to-be-transmitted region is a rectangle, and a size of at least one side of the to-be-transmitted region is identical with a size of at least one side of the second processed region.

For example, in some embodiments, the sending module 1526 is configured to output the first processed region and the second processed region to the display device 1510, that is, the sending module 1526 is used to implement step S231 in FIG. 13A.

For example, the sending module 1526 is configured to output the first image to the display device 1510.

For example, as shown in FIG. 16A, the display device 1510 may include a receiving module 1511, a second storage module 1512, a second scaling module 1513, and a display module 1514.

For example, the receiving module 1511 is configured to receive the first image sent by the sending module 1526.

For example, the sending module 1526 and the receiving module 1511 can achieve data transmission in a wired manner, for example, HDMI (high-definition multimedia interface) protocol or DP (DisplayPort) protocol can be used for data transmission. For example, the sending module 1526 and the receiving module 1511 both include a DP interface or an HDMI interface, and the sending module 1526 and the receiving module 1511 are connected through a signal line.

For another example, the sending module 1526 and the receiving module 1511 may implement data transmission in a wireless manner, for example, Bluetooth, network, NFC, infrared, etc.

For example, the second storage module 1512 may store the received first image. For example, the second storage module 1512 may be implemented as a register or the like. The present disclosure is not limited to this, and the second storage module 1512 can also be implemented as any component that can store data.

For example, the second scaling module 1513 is configured to use a first analyzing algorithm to process the first processed region and use a second analyzing algorithm to process the second processed region to obtain a second image.

For example, the resolution corresponding to the first analyzing algorithm is greater than the resolution corresponding to the second analyzing algorithm.

For example, the second scaling module 1513 may include a shader. For another example, the second scaling module 1513 may include an FPGA chip or the like. The FPGA chip can perform the analyzing processing. The pixel data processing capability of the FPGA chip is relatively strong and the cost of the FPGA chip is relatively low.

For example, the display module 1514 is used to display the second image. For example, the display module 1514 may include a display panel, and the second image is displayed on the display panel. The display panel may be a liquid crystal display panel (LCD), an organic light emitting diode display panel (OLED), etc.

For example, the display module 1514 may also include a driving chip (gate driver, source driver), a clock module (timing controller, TCON), and the like.

In the display system shown in FIG. 16A, the image processing device performs different processing on the first region in the original image and the original image to generate the first image. Because the second scaling module is provided in the display device, the image processing device can directly transmit the first image to the display device, the decompression processing is performed by the second scaling module in the display device to generate the second image for display, because the data amount of the first image is less than the data amount of the original image, the data transmission amount from the image processing device to the display device can be reduced, thereby saving data transmission bandwidth, saving power consumption, increasing the refresh rate, enhancing the user immersion and the user experience.

Figure 16B:
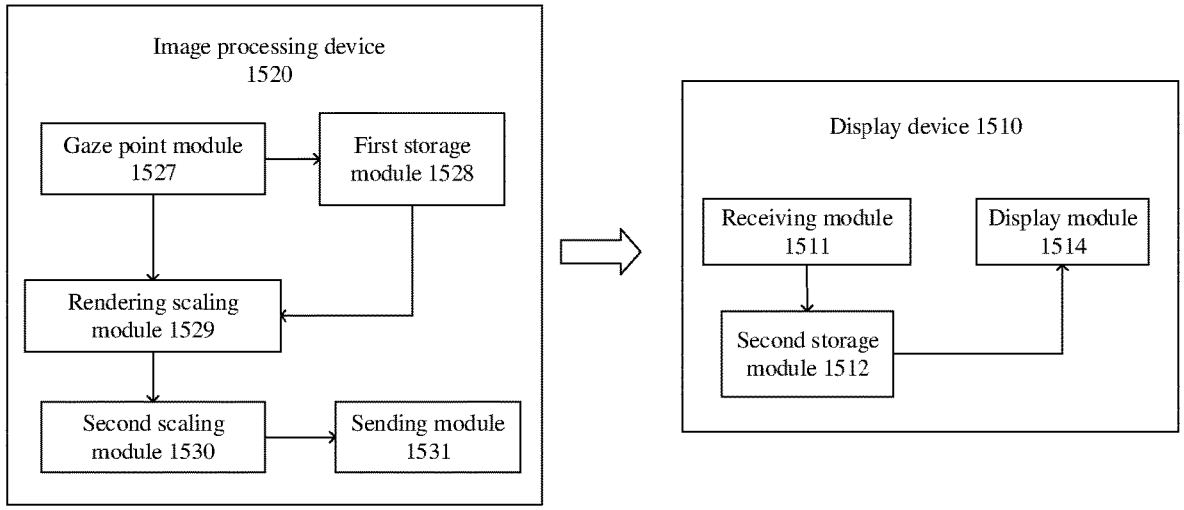
FIG. 16B is a schematic diagram of another display system provided by at least one embodiment of the present disclosure.

FIG. 16B is a schematic diagram of another display system provided by at least one embodiment of the present disclosure.

For example, in some embodiments, as shown in FIG. 16B, the image processing device 1520 may include a gaze point module 1527, a first storage module 1528, a rendering scaling module 1529, a second scaling module 1530, and a sending module 1531. The image processing device 1520 shown in FIG. 16B can be used to implement the image processing method shown in FIG. 13B.

For related descriptions of the gaze point module 1527 and the first storage module 1528, reference may be made to the above description of the gaze point module 1521 and the first storage module 1525, and the repetition will not be repeated.

For example, the rendering scaling module 1529 is configured to generate the first image. In other words, the rendering scaling module 1529 is used to implement step S200 in the image processing method shown in FIG. 13B.

For example, the rendering scaling module 1529 may include a shader.

For example, the first image includes the first region. The resolution of the region other than the first region in the first image is smaller than the resolution of the first region.

For example, the region other than the first region in the first image is the second region. When performing the operation of generating the first image, the rendering scaling module 1529 is configured to obtain the gaze point information of the human eye from the first storage module 1528; determine the target part of the virtual reality scene based on the gaze point information; use a first scene rendering algorithm to render the target part of the virtual reality scene to generate the first region of the first image; use a second scene rendering algorithm to render the region other than the target part in the virtual reality scene to generate the second region of the first image. In this embodiment, the first image may include the first region and the second region.

For example, in other embodiments, when performing the operation of generating the first image, the rendering scaling module 1529 is configured to obtain the gaze point information of the human eye from the first storage module 1528; determine the target part of the virtual reality scene based on the gaze point information; use a first scene rendering algorithm to render the target part of the virtual reality scene to generate the first region; use a second scene rendering algorithm to render the virtual reality scene to generate a scene rendering region; obtain the first image based on the position information of the first region, the first region, and the scene rendering region. The scene rendering region corresponds to the virtual reality scene, the resolution of the scene rendering region is smaller than the resolution of the first region, and the scene rendering region comprises a partial region corresponding to the first region, in this embodiment, the first image may comprise the scene rendering region, the first region, and information used to characterize the position of the first region in the scene rendering region.

For example, a resolution corresponding to the first scene rendering algorithm is greater than a resolution corresponding to the second scene rendering algorithm.

In the display system shown in FIG. 16B, in the process of generating the first image, the second region is directly generated by a rendering algorithm with a low resolution, so that rendering pressure can be reduced and the amount of rendering data can be reduced.

For example, the second scaling module 1530 is configured to perform analyzing processing on the first region by using a first analyzing algorithm to obtain the first to-be-displayed region and perform analyzing processing on at least a portion of the first image by using a second analyzing algorithm to obtain a second to-be-displayed region, and generate a second image based on the first to-be-displayed region and the second to-be-displayed region. In other words, the second scaling module 1530 is used to implement steps S210 to S230 in the image processing method shown in FIG. 13B.

For example, a resolution corresponding to the first analyzing algorithm is greater than a resolution corresponding to the second analyzing algorithm, and a resolution of the first to-be-displayed region is greater than a resolution of the second to-be-displayed region.

For example, in some examples, in a case where the first image includes the scene rendering region, the first region, and information used to characterize the position of the first region in the scene rendering region, the second scaling module 1530 may use the second analyzing algorithm to directly perform analyzing processing on the scene rendering region to obtain the second to-be-displayed region. In other examples, when the first image only includes the first region and the second region, the second scaling module 1530 may use the second analyzing algorithm to perform analyzing processing on the second region to obtain the second to-be-displayed region, in this case, the second to-be-displayed region corresponds to the second region.

For example, in a case where the second to-be-displayed region corresponds to the scene rendering region, the first image further comprises a plurality of pixels corresponding to a plurality of labeled pixel data, and the plurality of labeled pixel data are used to represent a position of the first region in the first image, that is, represent a position of the first region in the scene rendering region. When performing the operation of generating the second image based on the first to-be-displayed region and the second to-be-displayed region, the second scaling module 1530 is configured to analyze the first image to obtain the plurality of labeled pixel data; determine a position of the first to-be-displayed region in the second to-be-displayed region based on the plurality of labeled pixel data; based on the position of the first to-be-displayed region in the second to-be-displayed region, superimpose the first to-be-displayed region on the second to-be-displayed region to obtain the second image.

For example, the sending module 1531 is configured to output the second image to the display device. The second image can be displayed by the display device. In other words, the sending module 1531 is used to implement step S240 in the image processing method shown in FIG. 13B.

In the display system shown in FIG. 16B, the image processing device directly transmits the second image for display to the display device, so that the display device can directly display the second image without performing the decompression processing, therefore, the processing flow of the display device can be reduced, and the display device can be implemented as a conventional driving chip.

For example, in some embodiments, as shown in FIG. 16B, the display device 1510 may include a receiving module 1511, a second storage module 1512, and a display module 1514. For the specific functions implemented by the receiving module 1511, the second storage module 1512, and the display module 1514, reference may be made to the related description in the above embodiments.

It should be noted that the gaze point module 1521/1527 can be a module independent of the display device 1510 and the image processing device 1520, as long as the gaze point module 1521/1527 can transmit the gaze point of the human eye on the original image to the image processing device 1520. In other words, the image processing device 1520 may not include the gaze point module 1521/1527.

For example, the display device 1501 and the image processing device 1502 can transmit information through a network.

For example, in some embodiments, the second processing is the compression processing, the first scaling module can perform compression processing, and the second scaling module can perform decompression processing, the rendering scaling module can perform rendering processing and compression processing, and therefore, the first scaling module can also be called a compression module, the second scaling module can also be called a decompression module, and the rendering scaling module can also be called a rendering compression module.

For example, the gaze point module, the rendering module, the first scaling module, the rendering scaling module, the labeling module, the sending module, the receiving module, the second scaling module, and the display module can be implemented by software, hardware, firmware, and any combination thereof.

For example, the gaze point module, the rendering module, the first scaling module, the rendering scaling module, the labeling module, and/or the second scaling module include codes and programs stored in the memory; the processor may execute the codes and programs to achieve some or all of the functions of the gaze point module, the rendering module, the first scaling module, the rendering scaling module, the labeling module, and/or the second scaling module. For example, the gaze point module, the rendering module, the first scaling module, the rendering scaling module, the labeling module, and/or the second scaling module may be dedicated hardware devices to implement some or all of the functions of the gaze point module, the rendering module, the first scaling module, the rendering scaling module, the labeling module, and/or the second scaling module. For example, the gaze point module, the rendering module, the first scaling module, the rendering scaling module, the labeling module, and/or the second scaling module may be one circuit board or a combination of a plurality of circuit boards for achieving the functions described above. In the embodiment of the present disclosure, the one circuit board or the combination of the plurality of circuit boards may include: (1) one or more processors; (2) one or more non-transitory memories connected to the processors; and (3) the firmware stored in the memory executable by the processor.

It should be noted that the display system can achieve technical effects similar to the image processing method above, similar portions will not be repeated here.

Figure 17:
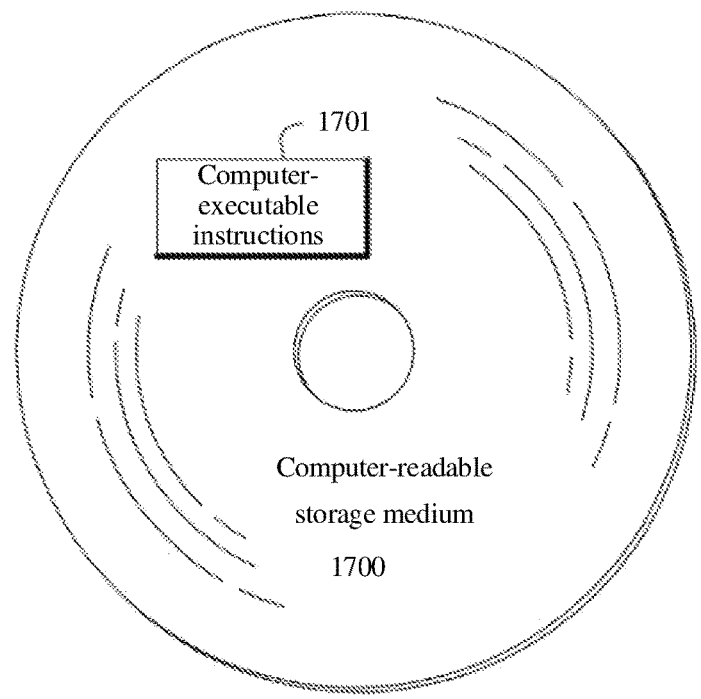
FIG. 17 is a schematic diagram of a computer-readable storage medium provided by an embodiment of the present disclosure.

At least one embodiment of the present disclosure also provides a computer-readable storage medium. FIG. 17 is a schematic diagram of a computer-readable storage medium provided by an embodiment of the present disclosure.

For example, as shown in FIG. 17, one or more computer-executable instructions 1701 may be non-transiently stored on the computer-readable storage medium 1700. For example, when the computer-executable instructions 1701 are executed by a computer, one or more steps in the image processing method according to any embodiment of the present disclosure may be performed.

For example, the computer-readable storage medium 1700 may be applied to the above-mentioned image processing device, for example, may be the memory 1401 in the image processing device 1400.

For example, for the description of the computer-readable storage medium 1700, reference may be made to the description of the memory 1401 in the embodiment of the image processing device, and repetitions will not be repeated.

For the present disclosure, the following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An image processing method, applied to an image processing device and comprising:
   determining a first region in an original image;
   performing first processing on the first region in the original image to obtain a first processed region;
   performing second processing on the original image to obtain a second processed region;
   generating a first image based on the first processed region and the second processed region;
   outputting the first image to a display device;
   wherein a resolution of the first processed region is greater than a resolution of the second processed region;
   wherein the image processing method further comprises:
   determining a plurality of boundary pixels in the original image based on a position of the first region in the original image, wherein the first region is a region defined by the plurality of boundary pixels in the original image, performing mapping processing on coordinate values of the plurality of boundary pixels to convert the coordinate values of the plurality of boundary pixels into a value interval corresponding to grayscale values of pixels in the first image to obtain a plurality of labeled pixel data; or determining at least one labeled pixel in the original image based on a position of the first region in the original image; performing mapping processing on a coordinate value of the at least one labeled pixel and size information of the first region to convert the coordinate value of the at least one labeled pixel and the size information of the first region into a value interval corresponding to grayscale values of pixels in the first image to obtain a plurality of labeled pixel data;

wherein the plurality of labeled pixel data is used to represent the position of the first region in the original image and is not used for display, and the first image comprises at least one pixel whose grayscale value is the plurality of labeled pixel data.

2. The image processing method according to claim 1, wherein performing the second processing on the original image to obtain the second processed region comprises:

determining a region other than the first region in the original image to obtain a second region;

performing the second processing on the second region to obtain the second processed region.

3. The image processing method according to claim 2, wherein the first processing comprises up-scaling processing or not processing, the second processing comprises down-scaling processing or not processing, performing the second processing on the second region comprises: performing down-scaling processing on the second region.

4. The image processing method according to claim 1, wherein performing the second processing on the original image to obtain the second processed region comprises:

analyzing the original image to obtain at least one image block;

performing the second processing on the at least one image block to obtain the second processed region.

5. The image processing method according to claim 4, wherein a region other than the first region in the original image is a second region, analyzing the original image to obtain at least one image block comprises:

dividing the second region into a plurality of image blocks that do not overlap with each other;

performing the second processing on the at least one image block to obtain the second processed region comprises:

rearranging the plurality of image blocks to generate a rearrangement region, wherein a shape of the rearrangement region is a rectangle;

performing the second processing on the rearrangement region to obtain the second processed region.

6. The image processing method according to claim 4, wherein the at least one image block comprises the original image;

performing the second processing on the at least one image block to obtain the second processed region comprises:

directly performing the second processing on the original image to obtain the second processed region.

7. The image processing method according to claim 4, wherein a shape of the first processed region and a shape of the second processed region are both rectangular, a size of at least one side of the first processed region is identical with a size of at least one side of the second processed region, respectively.

8. The image processing method according to claim 1, wherein a shape of the first region is a rectangle, a rhombus, a circle, an ellipse, or a triangle.

9. The image processing method according to claim 1, wherein a shape of the second processed region is a rectangle, generating the first image based on the first processed region and the second processed region comprises:

determining a to-be-transmitted region based on the first processed region and the second processed region, wherein the to-be-transmitted region comprises the first processed region, a shape of the to-be-transmitted region is a rectangle, and a size of at least one side of the to-be-transmitted region is identical with a size of at least one side of the second processed region;

generating the first image based on the to-be-transmitted region and the second processed region; or generating the first image based on the first processed region and the second processed region comprises:

determining a to-be-transmitted region based on the first processed region and the second processed region, wherein the to-be-transmitted region comprises the second processed region, a shape of the to-be-transmitted region is a rectangle, and a size of at least one side of the to-be-transmitted region is identical with a size of at least one side of the first processed region;

generating the first image based on the to-be-transmitted region and the first processed region.

10. The image processing method according to claim 1, wherein performing the first processing on the first region in the original image to obtain the first processed region comprises: performing the first processing on the first region to obtain a plurality of first image pixel data corresponding to all pixels in the first region; obtaining the first processed region based on the plurality of labeled pixel data and the plurality of first image pixel data; or performing the second processing on the original image to obtain the second processed region comprises: performing the second processing on the original image to obtain a plurality of second image pixel data corresponding to at least some pixels of the original image; obtaining the second processed region based on the plurality of labeled pixel data and the plurality of second image pixel data; or generating the first image based on the first processed region and the second processed region, comprises: generating the first image based on the plurality of labeled pixel data, the first processed region and the second processed region.

11. The image processing method according to claim 1, further comprising:

performing mapping processing on a processing parameter corresponding to the second processing to obtain at least one parameter pixel data.

12. The image processing method according to claim 11, wherein performing the first processing on the first region in the original image to obtain the first processed region comprises: performing the first processing on the first region to obtain a plurality of first image pixel data corresponding to all pixels in the first region; obtaining the first processed region based on the plurality of labeled pixel data, the at least one parameter pixel data, and the plurality of first image pixel data; or performing the second processing on the original image to obtain the second processed region comprises: performing the second processing on the original image to obtain a plurality of second image pixel data corresponding to at least some pixels of the original image; obtaining the second processed region based on the plurality of labeled pixel data, the at least one parameter pixel data, and the plurality of second image pixel data; or generating the first image based on the first processed region and the second processed region, comprises: generating the first image based on the plurality of labeled pixel data, the at least one parameter pixel data, the first processed region and the second processed region.

13. The image processing method according to claim 1, wherein determining the first region in the original image comprises:

determining a target pixel in the original image;

determining the first region based on the target pixel and a distance threshold, wherein a distance between each pixel in the first region and the target pixel is less than or equal to the distance threshold; or determining the first region in the original image comprises:

determining a target pixel in the original image;

determining that a region located in a predetermined shape with a predetermined size centered on the target pixel is the first region.

14. The image processing method according to claim 13, wherein the target pixel is a preset pixel, or the target pixel is a gaze point of a human eye on the original image.

15. The image processing method according to claim 1, wherein the display device performs analyzing processing on the first processed region by using a first analyzing algorithm and performs analyzing processing on the second processed region by using a second analyzing algorithm to obtain a second image, and the display device displays the second image.

16. The image processing method according to claim 15, wherein a resolution corresponding to the first analyzing algorithm is greater than a resolution corresponding to the second analyzing algorithm.

17. An image processing device, comprising:

a memory, configured to storage computer-readable instructions non-transiently;

a processor, configured to run the computer-readable instructions, wherein when the computer-readable instructions are executed by the processor, the image processing method according to claim 1 is implemented.

18. An image processing method, applied to an image processing device and comprising:

determining a first region in an original image;

performing first processing on the first region in the original image to obtain a first processed region;

performing second processing on the original image to obtain a second processed region;

outputting the first processed region and the second processed region to a display device;

wherein a resolution of the first processed region is greater than a resolution of the second processed region;

wherein the image processing method further comprises:

determining a plurality of boundary pixels in the original image based on a position of the first region in the original image, wherein the first region is a region defined by the plurality of boundary pixels in the original image, performing mapping processing on coordinate values of the plurality of boundary pixels to convert the coordinate values of the plurality of boundary pixels into a value interval corresponding to grayscale values of pixels in the first image to obtain a plurality of labeled pixel data; or determining at least one labeled pixel in the original image based on a position of the first region in the original image; performing mapping processing on a coordinate value of the at least one labeled pixel and size information of the first region to convert the coordinate value of the at least one labeled pixel and the size information of the first region into a value interval corresponding to grayscale values of pixels in the first image to obtain a plurality of labeled pixel data;

wherein the plurality of labeled pixel data is used to represent the position of the first region in the original image and is not used for display, and the plurality of labeled pixel data is a grayscale value of at least one pixel and is output to the display device together with the first processed region and the second processed region.

19. The image processing method according to claim 18, wherein the display device performs analyzing processing on the first processed region by using a first analyzing algorithm to obtain a first to-be-displayed region, performs analyzing processing on the second processed region by using a second analyzing algorithm to obtain a second to-be-displayed region, and the display device displays the first to-be-displayed region and the second to-be-displayed region.

* * * * *